United States Patent
Venu et al.

(10) Patent No.: US 8,856,176 B1
(45) Date of Patent: Oct. 7, 2014

(54) METHOD AND SYSTEM FOR PROVIDING A FILE MANAGEMENT SYSTEM INCLUDING AUTOMATED FILE PROCESSING FEATURES

(75) Inventors: Aravinth Venu, Fremont, CA (US); Victoria Dolginsky, Los Gatos, CA (US); Bruce Wobbe, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 430 days.

(21) Appl. No.: 13/219,072

(22) Filed: Aug. 26, 2011

(51) Int. Cl.
*G06F 7/00* (2006.01)
*G06F 17/30* (2006.01)

(52) U.S. Cl.
USPC .......................................................... 707/783

(58) Field of Classification Search
None
See application file for complete search history.

(56) References Cited

U.S. PATENT DOCUMENTS

| | | | |
|---|---|---|---|
| 7,191,466 B1 | 3/2007 | Hamid et al. | |
| 7,366,720 B2 * | 4/2008 | Deshpande | 709/226 |
| 7,451,147 B1 | 11/2008 | Kao et al. | |
| 7,788,304 B2 | 8/2010 | Kotani | |
| 8,150,728 B1 | 4/2012 | Bayer et al. | |
| 8,296,570 B2 | 10/2012 | Hamid et al. | |
| 2007/0113193 A1 * | 5/2007 | Popp et al. | 715/760 |
| 2009/0300020 A1 | 12/2009 | Chen et al. | |
| 2010/0192157 A1 | 7/2010 | Jackson | |
| 2010/0211438 A1 | 8/2010 | Lutnick et al. | |
| 2010/0287219 A1 * | 11/2010 | Caso et al. | 707/827 |
| 2012/0110515 A1 | 5/2012 | Abramoff et al. | |
| 2013/0166560 A1 | 6/2013 | Secord et al. | |

OTHER PUBLICATIONS

Venu et al., "Method and System for Providing an Improved Password Vault," U.S. Appl. No. 13/219,127, filed Aug. 26, 2011.
Venu et al., "Method and System for Creation of Automatic Customer Lists and Virtual Related File Listings," U.S. Appl. No. 13/219,164, filed Aug. 26, 2011.

* cited by examiner

*Primary Examiner* — Robert Beausoliel, Jr.
*Assistant Examiner* — Michael Pham
(74) *Attorney, Agent, or Firm* — Hawley Troxell Ennis & Hawley LLP; Philip McKay

(57) ABSTRACT

A file management system provides one or more virtual file listing displays through which a user can select and access files and an improved password vault created through the file management system. When files listed in the one or more virtual file listing displays are selected for access, the appropriate parent data processing application(s), and/or version(s) of the appropriate parent data processing application(s), is/are identified by the file management system and the appropriate parent data processing application(s) is/are opened/launched automatically through the file management system. The individual passwords associated with the selected files are then automatically provided to the appropriate parent data processing application(s) by the password vault, and/or through the file management system. The file management system, and improved password vault, are then used to automatically perform file processing functions, such as batch processing of files and/or file restoration.

18 Claims, 7 Drawing Sheets

QuickBooks File Manager 2011

Clients ▼ | Groups ▼ | Files ▼ | Password Vault ▼ | Batch Upgrade... | Options... | ? Help ▼

Clients

Groups
All My Clients ▼ 🔍

Search

- Annies Apples
- Buffalo Bills
- Cahill Connections
- Doggie Treats Galore
- Eugene Painting
- Fish Fry Friday
- Galloping Ponies
- Hallmark Cards
- Ingrid & Daughters
- Jelly Beans
- Kindercare – Southlake
- Lilly Flowers
- Master Mechanic
- Nancie's Notions
- Olive's Olives
- Preston Parking
- Quest
- Rest Plus

507

Annies Apples  503

Current Groups ▼

⊟ Company Files  ⚙▼

| File Name | Location | Last Modified ▼ | Version |
|---|---|---|---|
| Annies Apples.qbw | C:/Clients/2010 | 1/23/2010 | QBAE 2010 |
| Annies Apples.qbw | C:/Clients/2010 | 4/15/2009 | QBAE 2009 |
| Annies Apples.qbw | C:/Clients/2009 | 3/02/2008 | QBAE 2008 |

⊟ Accountant's Copy Files  ⚙▼

| File Name | Location | Type | Created ▼ | Version |
|---|---|---|---|---|
| Annies Apples.qba | C:/Clients/2010 | Accountant's Copy | 1/23/2010 | QBAE 2010 |
| Annies Apples.qbx | C:/Clients/2009 | Transfer In | 4/15/2009 | QBAE 2009 |
| Annies Apples.qby | C:/Clients/2008 | Transfer Out | 3/02/2009 | QBAE 2008 |

⊟ Backup and Portable Files  ⚙▼

| File Name | Location | Type | Created ▼ | Version |
|---|---|---|---|---|
| Annies Apples.qbb | C:/Clients/2010 | Backup | 1/23/2010 | QBAE 2010 |
| Annies Apples.qbm | C:/Clients/2009 | Portable | 4/15/2009 | QBAE 2009 |
| Annies Apples.qbm | C:/Clients/2008 | Portable | 3/02/2009 | QBAE 2008 |

Notes: Annies Apples still need to provide receipts for the month.

Password Vault

Password Vault

Enter the username and password for your clients' Quickbooks files. If you use different login information for specific files, click Client Login Options.

Note: For security reasons, the entered usernames and passwords are masked.

| Client Name | Username | Password | Confirm Password |
|---|---|---|---|
| Annies Apples | ************ | ************ | ************ |
| Buffalo Bills | ************ | ************ | ************ |
| Cahill Connections | ************ | ************ | ************ |
| Doggie Treats Galore | ************ | ************ | ************ |
| Eugene Painting | ************ | ************ | ************ |
| Fish Fry Friday | ************ | ************ | ************ |
| Galloping Ponies | file-specific logins | file-specific logins | file-specific logins |
| Hallmark Cards | ************ | ************ | ************ |
| Ingrid & Daughters | ************ | ************ | ************ |
| Jelly Beans | ************ | ************ | ************ |
| Kindercare – Southlake | ************ | ************ | ************ |
| Lilly Flowers | ************ | ************ | ************ |

603

Client Login Options...    605    607    609

OK    Cancel

601

METHOD AND SYSTEM FOR PROVIDING A FILE MANAGEMENT SYSTEM INCLUDING AUTOMATED FILE PROCESSING FEATURES

BACKGROUND

Currently, numerous data processing systems and applications, herein referred to collectively as data processing applications" or "applications", are available to help users organize and process data. Examples of data processing applications include, but are not limited to, accounting and/or bookkeeping applications, tax preparation applications, healthcare expense tracking applications, docketing applications, etc.

Many of these data processing applications are used by "professional" users to create, organize, and store, multiple files, and/or documents, often for multiple clients, and/or for multiple projects. Herein, the term "professional user" includes, but is not limited to, any party that uses a data processing application to create, organize, and store, multiple files, and/or documents, for multiple clients, parties, purposes, or projects. For instance, as one example, accountants often use one or more versions of a given accounting and/or bookkeeping application to create documents, files, and/or folders, for multiple different clients.

Currently, when a user implements one or more versions of a data processing application to obtain, receive, create, organize, and store, multiple documents, and/or files, for multiple clients, and/or for multiple projects, the user typically creates their own unique data management and organizational scheme or structure to store files and documents in a data storage system, such as on/in one or more disk drives/hard drives, network drives, memories, etc., and these data management and organizational schemes are often redundant, spread across multiple data storage system locations and/or data storage systems, and often reflect the user's unique sense of order and structure which may, or may not, be intuitive to others.

In addition, when a user implements a data processing application to obtain, receive, create, organize, and store, multiple documents, and/or files, for multiple clients, and/or for multiple projects, the user often creates, and needs to access files, and/or documents, that are often of different file, and/or document, types such as, but not limited to: a user/company file, and/or document; a backup file, and/or document; an account file, and/or document, etc. Consequently, the user often incorporates data indicating the file type into their own unique data management and organizational scheme which adds a further element of complication, and often redundancy.

In addition, a user must often work with client files, and/or documents, that are associated with two or more versions of a "parent" data processing application, such as an accounting/bookkeeping application. Consequently, the user often incorporates data indicating the version of the parent data processing application into their own unique data management and organizational scheme which not only adds another element of complication, and often redundancy, but creates issues when an attempt is made to access the files, and/or documents, regarding which parent data processing application version should be used to access the files, and/or documents.

The fact that different users of data processing applications utilize different data storage and organization schemes, largely custom created by the users, to store files, and/or documents, means that currently it is often very difficult to automatically create accurate client lists and/or group/display files, and/or documents, for a given client or project. Consequently, logical data grouping, display, and analysis is extremely difficult and must currently be performed largely on a manual basis. However, despite the difficulties created by their individual data storage and organization schemes, most users of data processing applications prefer their own data storage and organization schemes and do not want to have the actual data associated with their client's files, and/or documents, moved out of the data's current physical memory location, or have any changes made to their own underlying data organization and storage system.

In addition, when a user uses a data processing application to create, organize, and store, multiple files, and/or documents, for multiple clients, and/or for multiple projects, the files, and/or documents, associated with each individual client/project are typically assigned passwords, logins, or other access restricting mechanisms, herein collectively referred to as "passwords", that the user must provide before access to the group of files, and/or documents, associated with the client/project is allowed. In addition, in many cases, individual files, and/or documents, associated with individual clients may themselves be assigned individual passwords that a user must provide before access to the individual documents, files, and/or folders is allowed.

Since, as noted, many data processing applications are used to create, organize, and store, multiple documents, for multiple clients, and/or for multiple projects, it is often necessary for a user to retain and provide multiple passwords for use with multiple applications and/or multiple clients/projects. Retaining/remembering multiple passwords, and having to provide the multiple passwords repeatedly, for various applications is difficult and time consuming, thereby putting a significant burden on the users, particularly professional users, of the various data processing applications. In addition, the need for retaining/remembering multiple passwords often creates a security risk that defeats the purpose of requiring passwords in the first place.

For instance, some users of data processing applications keep spreadsheets of clients/projects, and/or files and folders, and their associated passwords, that, if obtained by a third party, would allow the third party access to all clients/projects, and/or files and folders. In some cases, lists of clients/projects, and/or files and folders, and their associated passwords, are maintained by users in a printed, or hardcopy, form that is even less secure, and more susceptible to unwanted access by third parties; some users even use post-its or other highly informal, and insecure, mechanisms.

In addition, the fact that a user must often work with client files, and/or documents, that are associated with two or more versions of a "parent" data processing application, and that the files, and/or documents, associated with each individual client/project are typically assigned individual passwords, logins, or other access restricting mechanisms, makes it extremely difficult to access multiple files, and/or documents, and process the multiple files, and/or documents, in batches, such as would be necessary to perform a batch upgrade. This is because in order to access the multiple files, and/or documents, the correct version of the data processing application must be identified and launched for each file, and/or document, and used to access the files, and/or documents. In addition, the individual passwords for the files, and/or documents, must be determined, and provided, before access to the files, and/or documents, is allowed.

Similarly, in order to restore a user/company, file, e.g. a working copy, from a backup file, a portable file, or a user copy transfer file, the user must currently first identify the correct file type/version, then determine the appropriate version of the parent data processing application to launch, restore a user/company copy of the file, and then determine and provide the individual password for the user/company file. This is currently a largely manual, and time-consuming, process.

As a result of the situation described above, currently, a professional user using a data processing application to create, organize, and store, multiple files, and/or documents, for multiple clients, and/or for multiple projects, must dedicate a significant portion of their "working" time to: creating and navigating their unique data management and organizational scheme or structure; trying to determine accurate client lists and/or group/display files, and/or documents, for either a given client or project; retaining/remembering multiple passwords, and having to provide the multiple passwords repeatedly, for various applications; largely manually, or individually, performing necessary processing of files, such as batch upgrades; and largely manually restoring files.

What is needed is a method and system that allows for simple and effective organization of multiple files, and/or documents, for multiple clients and/or projects and helps the user automate key file processing and maintenance functions, such as batch processing and restoration of files, without physically changing the current memory location of the data representing the files, and/or documents, or making any changes to user's existing underlying data storage and organization system/scheme.

SUMMARY

In accordance with one embodiment, a method and system for providing a file management system including automated file processing features includes a process for providing a file management system including automated file processing features whereby, in one embodiment, a file management system is provided that is associated with one or more parent data processing applications. In one embodiment, the file management system identifies, and/or groups, files, and/or documents, created, processed, stored, or used by, the associated one or more parent data processing applications. In one embodiment, the file management system provides one or more virtual file listings of the files, and/or documents, through which a user can select and access the files, and/or documents, in/from their original physical memory locations.

In one embodiment, the parent data processing applications, and/or versions of the parent data processing applications, associated with the virtual file listings are associated with their respective files, and/or documents, by the file management system and, in one embodiment, are also shown in the virtual file listings in the file management system. In one embodiment, the one or more parent data processing applications associated with the listed files, and/or documents, can be opened/launched through the file management system when the associated files, and/or documents, are selected for access. However, while the listed files, and/or documents, are displayed as one or more virtual file listing displays through the file management system, the original physical memory locations of the data representing the files, and/or documents, listed in the one or more virtual file listing displays is not changed, nor is any change made to the user's existing underlying data storage and organization system/scheme.

In one embodiment, a global file management user login/password is selected by, and/or assigned to, a user of the file management system and the global file management user login/password is used by the user to access the file management system.

In one embodiment, an improved password vault is created by the user through the file management system. In one embodiment, the improved password vault includes a listing of files, and/or documents, and the individual passwords associated with the files, and/or documents. In one embodiment, data indicating/representing the individual passwords associated with the files, and/or documents, is entered into the improved password vault through the file management system only when the specific files, and/or documents, and associated passwords are being initially entered into the improved password vault through the file management system, or when the individual passwords are being modified.

In one embodiment, when a user selects a file listed in the one or more virtual file listing displays through the file management system, the associated parent data processing application, and/or version of the application, is identified by the file management system and the appropriate data processing application, and/or version of the application, is opened/launched automatically through the file management system.

In one embodiment, when a file listed in the one or more virtual file listing displays is selected through the file management system, the user/selector is requested to provide the user's global file management user login/password. Once the user's global file management user login/password is provided and authenticated, the parent data processing applications are opened/launched through the file management system.

In one embodiment, the individual passwords associated with the files, and/or documents, are automatically provided to the appropriate version of the parent data processing applications, and/or access to the files, and/or documents, is automatically provided to the appropriate versions of parent data processing applications, by the improved password vault, and/or through the file management system. The appropriate versions of parent data processing applications, and therefore the user, are thereby provided access to files, and/or documents without the user having to remember and/or provide the individual passwords associated with the files, and/or documents.

In one embodiment, batch processing, such as batch upgrades of files, are performed semi-automatically, or automatically, using the file management system and improved password vault. In one embodiment, the user selects the batch of files, and/or documents, to be processed from the one or more virtual file listing displays through the file management system. The individual files, and/or documents, are then accessed by automatically determining the appropriate version of the data processing application from the file management system necessary to access the selected files, and/or documents, and launching the appropriate version of the data processing application through the file management system, in one embodiment, in the background. The appropriate individual passwords associated with the files, and/or documents, are automatically provided to the appropriate version of the parent data processing applications by the improved password vault, and/or through the file management system. Accesses to the files, and/or documents, is thereby provided, and each file, and/or document, is processed one at a time by creating a backup of the file, and/or document, and then completing the file processing, such as a file upgrade. Consequently, all selected/designated files, and/or documents, in the batch are accessed for processing, and processed, without the user having to remember the appropriate version of the parent data processing applications or having to provide the individual passwords associated with the individual files, and/or documents.

In one embodiment, file restoration is also performed automatically using the file management system and improved password vault. In one embodiment, if a user needs to restore a selected file, and/or document, from a backup file, the user first activates the backup file through the file management system. The appropriate version of the parent data processing application necessary to access the selected backup file is then identified and launched on the user's computing system by the file management system and the selected backup file is passed in, and launched, by the appropriate version of the parent data processing application. When the appropriate version of the parent data processing application launches the backup file, the appropriate version of the parent data processing application automatically detects that the file is a backup file and that the backup file is being launched from the file management system. As a result, once the appropriate version of the parent data processing application finishes loading the backup file, the appropriate version of the parent data processing application initiates an automatic file restore process whereby a restored user/company file is created based off the selected backup file. The appropriate version of the parent data processing application then opens the restored user/company file and the appropriate password is automatically provided to the appropriate version of parent data processing application by the improved password vault, and/or through the file management system. The appropriate version of parent data processing application then applies the password and accesses the restored user/company version of the file.

Using the method and system for providing a file management system including automated file processing features, as discussed herein, client and/or project lists are automatically created based on actual data, files, and/or documents, in the user's data system and customizable virtual related file listings are created to display listings of related files, and/or documents, without physically changing the current memory location of the data representing the files, and/or documents, or making any changes to user's existing underlying data storage and organization system/scheme.

In addition, using the method and system for providing a file management system including automated file processing features, as discussed herein, an improved password vault is implemented, and passwords are provided, through the file management system. Therefore, the improved password vault is well suited to implementation with data processing applications that require the creation, retention, and use of multiple passwords associated with multiple clients/projects, and/or files, and/or folders, created and/or processed by the data processing applications. Consequently, the improved password vault provides applications, and users of the applications, simple, selective, and secure access to multiple passwords associated with multiple clients/projects, and/or files, and/or folders.

In addition, using the method and system for providing a file management system including automated file processing features, as discussed herein, the file management system and improved password vault are used to automate and simplify file processing and maintenance functions, such as batch processing and restoration of files, without physically changing the current memory location of the data representing the files, and/or documents, or making any changes to user's existing underlying data storage and organization system/scheme and without requiring users of data processing applications to retain and provide multiple passwords associated with multiple clients/projects, and/or files, and/or folders. Consequently, using the using the method and system for providing a file management system including automated file processing features, as discussed herein, a significant burden is removed from the user and potential security risks are avoided.

BRIEF DESCRIPTION OF THE DRAWINGS

FIG. 5 is an illustrative example of a file management system virtual file listing display, as displayed on a display device of an exemplary user computing system, in accordance with one embodiment;

FIG. 6 is an illustrative example of a user interface display for creating, and displaying, an improved password vault in accordance with one embodiment.

Figure 1:
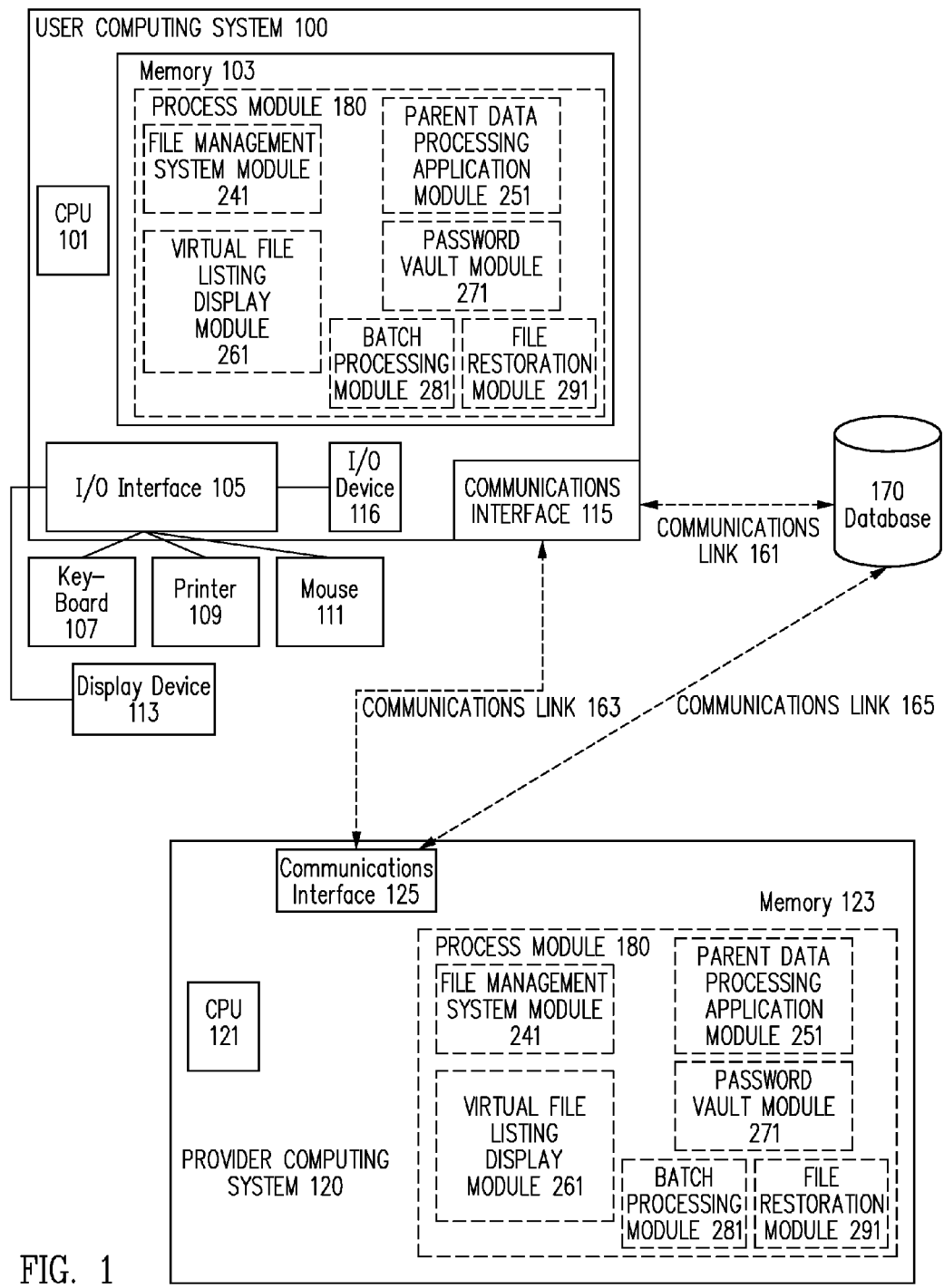
FIG. 1 is a block diagram of an exemplary hardware architecture for implementing one embodiment including a user computing system, a provider computing system, and a database, connected by various communications links/channels in accordance with one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIGS., and/or described below.

In accordance with one embodiment, a file management system is provided. In accordance with one embodiment, the file management system is provided on a user computing system. In accordance with one embodiment, the file management system is provided on a provider computing system.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, the computing systems are connected, and/or otherwise operably coupled, to one or more mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, the file management system is an application that identifies, collects, groups, and/or presents, multiple files, and/or documents, created by, provided by, stored by, and/or otherwise associated with, one or more parent data processing applications.

In various embodiments, the file management system is associated with a single parent data processing application and only files, and/or documents, created by one or more versions of the parent data processing application are processed by the file management system. One specific illustrative example is Quickbooks File Manager™ available from Intuit, Inc. of Mountain View, Calif. that identifies, collects, groups, and presents multiple files, and/or documents, created using various versions of Quickbooks™, also available from Intuit, Inc. of Mountain View, Calif.

In various embodiments, the file management system is associated with multiple parent data processing applications. In various embodiments, the parent data processing applications can be any data management applications implemented on a computing system and/or accessed through a network.

As used herein, the terms "application", "data management application" and "parent data processing application" are used interchangeably and include, but are not limited to: computing system implemented, and/or online, personal and/or or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; computing system implemented, and/or online, docketing systems, packages, programs, modules, or applications; computing system implemented, and/or online, bookkeeping systems, packages, programs, modules, or applications; and various other personal and/or business electronic data management systems, packages, programs, modules, or applications, whether known at the time of filling or as developed later.

Specific examples of data management applications include, but are not limited to: QuickBooks™, available from Intuit, Inc. of Mountain View, Calif.; QuickBooks On-line™, available from Intuit, Inc. of Mountain View, Calif.; Quicken™, available from Intuit, Inc. of Mountain View, Calif.; Quicken On-line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other data management applications discussed herein, and/or known to those of skill in the art at the time of filing, and/or as developed after the time of filing.

As discussed in more detail below, in one embodiment, the file management system provides a virtual file listing of the files, and/or documents, processed by the file management system in one or more virtual file listing displays. In one embodiment, a user can select and access the files, and/or documents, which reside in their original respective physical memory locations, through the one or more virtual file listing displays of the file management system. In one embodiment, a user can select and access the files, and/or documents, through the one or more virtual file listing displays of the file management system via a user interface display and one or more user interface devices such as a keyboard, a mouse, a touchpad, voice recognition software, or any other mechanism or device for converting user actions into processor instructions and/or computer commands/actions.

In one embodiment, the parent data processing applications, and/or versions of the parent data processing applications, associated with the listed files, and/or documents, of the one or more virtual file listing displays are associated with their respective files, and/or documents, in the file management system and, in one embodiment, are also shown in the one or more virtual file listing displays in the file management system.

In one embodiment, the one or more virtual file listing displays in the file management system are "virtual" in that the actual files, and data, are represented, and can be linked to, but the actual files, and data, are not moved from their physical location in memory or their underlying file structure, i.e., data storage and organization scheme, or data storage system.

In one embodiment, the one or more parent data processing applications associated with the listed files, and/or documents, in the one or more virtual file listing displays in the file management system can be opened/launched through the file management system when the associated files, and/or documents, are selected for access, and/or when the parent data processing applications themselves are selected.

In one embodiment, a global file management user login/password is selected by, and/or assigned to, a user of the file management system. In one embodiment, the global file management user login/password is used by the user to access the file management system in response to a challenge/requirement from the file management system, typically made when signing into the file management system or when access to a file or parent data processing application is requested.

In one embodiment, an improved password vault is created by the user through the file management system. In one embodiment, the improved password vault includes a listing of all files, and/or documents, that are processed by, and/or accessed through, the file management system and the individual passwords required to access the files, and/or documents, that are processed by, and/or accessed through, the file management system.

In one embodiment, data representing the files, and/or documents, and the individual passwords associated with the files, and/or documents, is entered into the improved password vault through the file management system via a user interface display and one or more user interface devices such as a keyboard, a mouse, a touchpad, voice recognition software, or any other mechanism or device for converting user actions into processor instructions and/or computer commands/actions.

In one embodiment, the data representing the files, and/or documents, and the individual passwords associated with the files, and/or documents, are linked to each other, mapped to each other, or otherwise associated with each other.

In one embodiment, the data representing the files, and/or documents, and the individual passwords associated with the files, and/or documents, are linked to each other, mapped to each other, or otherwise associated with each other, using one or more processors associated with one or more computing systems.

In one embodiment, data representing and linking the files, and/or documents, and the individual passwords associated with the files, and/or documents, is entered into the improved password vault through the file management system only when the specific files, and/or documents, and passwords are being initially entered into the improved password vault through the file management system, or when the individual passwords are being modified.

In one embodiment, data representing and linking the files, and/or documents, and the individual passwords associated with the files, and/or documents, is securely stored in the password fault under the direction of one or more processors associated with one or more computing systems.

In various embodiments, parent data processing applications, and/or specific versions of the parent data processing applications, associated with the specific files, and/or documents, that should legitimately need access to the specific files, and/or documents, are also linked with the data indicating and linking the specific files, and/or documents, and passwords and this data is also securely stored in the password fault.

In one embodiment, batch processing, such as batch upgrades of files, is performed semi-automatically, or automatically, using the file management system and improved password vault. In one embodiment, when a user desires to perform a given process, such as a version or file update, on multiple files, i.e., the user desires to initiate batch processing, the user selects the batch of files, and/or documents, to be processed from the one or more virtual file listing displays through the file management system.

In one embodiment, the user selects the batch of files, and/or documents, to be processed from the one or more virtual file listing displays through a user interface display of the file management system and one or more user interface devices such as a keyboard, a mouse, a touchpad, voice recognition software, or any other mechanism or device for converting user actions into processor instructions and/or computer commands/actions.

In one embodiment, the associated parent data processing applications, and/or versions of the applications, for the selected files, and/or documents, are identified by the file management system and the correct parent data processing application(s) is/are opened/launched automatically through the file management system. In one embodiment, the appropriate versions of the data processing applications are used to launch the selected individual files, and/or documents, through the file management system in the background.

In one embodiment, when the user selects the batch of files, and/or documents, to be processed from the one or more virtual file listing displays, the user is requested to provide the user's global file management user login/password, and/or username.

In one embodiment, once the user's global file management user login/password, and/or username, is provided and authenticated, and the parent data processing applications associated with the selected files, and/or documents, are opened/launched through the file management system, the individual passwords associated with the files, and/or documents, are automatically provided, or made available, to the parent data processing applications by the improved password vault, and/or through the file management system.

In one embodiment, once the user's global file management user login/password, and/or username, is provided and authenticated, and the parent data processing applications associated with the selected files, and/or documents, are opened/launched through the file management system, the individual passwords associated with the files, and/or documents, are provided to the parent data processing applications by the improved password vault, and/or through the file management system, for a defined time or in association with a specific token or use mechanism.

In one embodiment, each selected individual file, and/or document, is then automatically and sequentially accessed using the appropriate version of the parent data processing application and the appropriate password, and each selected individual file, and/or document, is automatically processed, in one embodiment, in the background, one at a time, by creating a backup of the file, and/or document, and then completing the file processing, such as a file upgrade. Consequently, in one embodiment, all the selected/designated individual files, and/or documents, in the batch are accessed for processing, and processed, without the user having to remember the appropriate version of the parent data processing applications or having to provide the individual passwords associated with the individual files, and/or documents, and without changing the physical memory locations of the data representing the files, and/or documents, or making any changes to the user's existing underlying data storage and organization system/scheme.

In one embodiment, file restoration is performed automatically using the file management system and improved password vault.

In one embodiment, if a user needs to restore a selected file, and/or document, from a backup file, the user first activates/selects the backup file through the file management system. In one embodiment, the user activates/selects the backup file through a user interface display of the file management system and one or more user interface devices such as a keyboard, a mouse, a touchpad, voice recognition software, or any other mechanism or device for converting user actions into processor instructions and/or computer commands/actions.

In one embodiment, the associated parent data processing application, and/or version of the application, for the selected backup file, and/or document, is identified by the file management system and the correct parent data processing application is opened/launched automatically through the file management system.

In one embodiment, the selected backup file, and/or document, is passed in, and launched, by the appropriate version of the parent data processing application. In one embodiment, the appropriate version of the data processing application is used to launch the selected backup file, and/or document, through the file management system in the background.

In one embodiment, when the user selects the backup file, or document, the user is requested to provide the user's global file management user login/password, and/or username.

In one embodiment, once the user's global file management user login/password, and/or username, is provided and authenticated, and the appropriate version of the parent data processing application associated with the selected backup file, or document, is opened/launched through the file management system, the selected backup file, or document, is opened/launched by the appropriate version of the parent data processing application.

In one embodiment, when the appropriate version of the parent data processing application launches the backup file, the appropriate version of the parent data processing application automatically detects that the file is a backup file and that the backup file is being launched from the file management system. As a result, once the appropriate version of the parent data processing application finishes loading the backup file, the appropriate version of the parent data processing application initiates an automatic file restore process whereby a restored user/company file is created based off the selected backup file.

The appropriate version of the parent data processing application then opens the restored user/company file and the individual password associated with the restored user/company file is automatically provided, or made available to, to the parent data processing application by the improved password vault, and/or through the file management system.

The appropriate version of parent data processing application then applies the appropriate password and accesses the restored user/company version of the file. Consequently, in one embodiment, a user/company file is automatically restored from a backup file, and/or document, without the user having to remember the appropriate version of the parent data processing application or having to provide the individual password associated with the individual file, and/or document, and without changing the physical memory locations of the data representing the files, and/or documents, or making any changes to the user's existing underlying data storage and organization system/scheme.

Those of skill in the art will readily recognize that the specific examples above were provided for illustrative purposes only and that numerous other uses and/or applications of the method and system for providing a file management system including automated file processing features are possible, and are envisioned. Consequently, the specific examples discussed above do not limit the scope of the claims presented below.

Hardware Architecture

FIG. 1 is a block diagram of an exemplary hardware architecture for implementing one embodiment of a system and method for providing a file management system including automated file processing features, such as exemplary processes 200 and 300 discussed herein, that, returning to FIG. 1, includes: a user computing system 100, i.e., a first computing system; an optional provider computing system 120, e.g. a second computing system; and an optional database 170, all operatively coupled by communication links/channels 161, 163, and 165.

As noted above, herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As noted above, herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As seen in FIG. 1, in one embodiment, user computing system includes a central processing unit (CPU) 101; an I/O interface 105; a communications interface 115; and a memory system 103 including process module 180.

Figure 2:
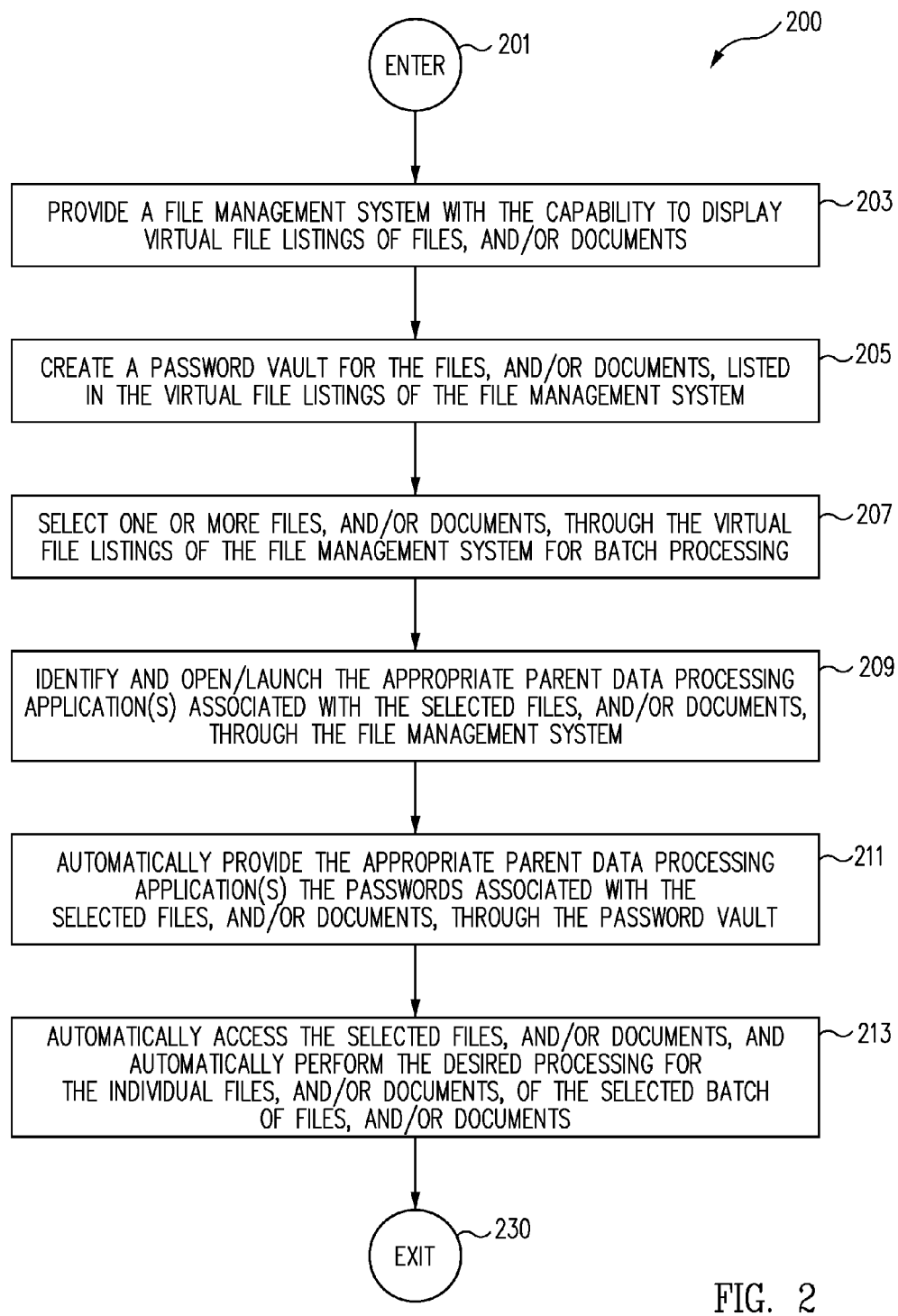
FIG. 2 is a flow chart depicting one embodiment of a process for providing a file management system including automated file processing features and performing batch processing in accordance with one embodiment.

As seen in FIG. 2, user computing system 100 includes a display device 113. User computing system 100 may also include standard user interface devices such as a keyboard 107, a mouse 111, a touch pad (not shown) as well as, one or more standard input/output (I/O) devices 116. As seen in FIG. 2, user computing system 100 may further include/have access to a printer 109.

In one embodiment, user computing system 100 is connected, and/or otherwise operably coupled, to one or more communications links/channels, such as communications links/channels 161 and 163, and/or mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

As seen in FIG. 2, memory 103 includes process module 180. In various embodiments, process module 180 can store data and/or instructions associated with, but not limited to, a process for providing a file management system including automated file processing features, such as processes 200 and/or 300 of FIG. 2.

As also seen in FIG. 2, process module 180 includes file management system module 241. File management system module 241 includes procedures, data, and/or instructions, for implementing a file management system.

In accordance with one embodiment, the file management system of file management system module 241 is provided on user computing system 100. In accordance with one embodiment, the file management system of file management system module 241 is provided on provider computing system 120.

In one embodiment, the file management system of file management system module 241 is an application that identifies, collects, groups, and/or presents, multiple files, and/or documents, created by, provided by, stored by, and/or otherwise associated with, one or more parent data processing applications as included in parent data processing application module 251.

In various embodiments, the file management system of file management system module 241 is associated with a single parent data processing application of parent data processing application module 251 and only files, and/or documents, created by one or more versions of the parent data processing application are processed by the file management system. One specific illustrative example is Quickbooks File Manager™ available from Intuit, Inc. of Mountain View, Calif. that identifies, collects, groups, and presents multiple files, and/or documents, created using various versions of Quickbooks™, also available from Intuit, Inc. of Mountain View, Calif.

In various embodiments, the file management system of file management system module 241 is associated with multiple parent data processing applications of parent data processing application module 251. In various embodiments, the parent data processing applications can be any data management applications implemented on a computing system and/or accessed through a network.

As used herein, the terms "application", "data management application" and "parent data processing application" are used interchangeably and include, but are not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; computing system implemented, and/or online, docketing systems, packages, programs, modules, or applications; computing system implemented, and/or online, bookkeeping systems, packages, programs, modules, or applications; and various other personal and/or business electronic data management systems, packages, programs, modules, or applications, whether known at the time of filling or as developed later.

Specific examples of data management applications include, but are not limited to: QuickBooks™, available from Intuit, Inc. of Mountain View, Calif.; QuickBooks On-line™, available from Intuit, Inc. of Mountain View, Calif.; Quicken™, available from Intuit, Inc. of Mountain View, Calif.; Quicken On-line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other data management applications discussed herein, and/or known to those of skill in the art at the time of filing, and/or as developed after the time of filing.

In various embodiments, the file management system of file management system module 241 provides a virtual file listing of the files, and/or documents, processed by the file management system in one or more virtual file listing displays of virtual file listing display module 261. In one embodiment, a user can select and access the files, and/or documents, which reside in their original respective physical memory locations, through the one or more virtual file listing displays of the file management system. In one embodiment, a user can select and access the files, and/or documents, through the one or more virtual file listing displays of the file management system via a user interface display and one or more user interface devices such as a keyboard, a mouse, a touchpad, voice recognition software, or any other mechanism or device for converting user actions into processor instructions and/or computer commands/actions.

In one embodiment, the parent data processing applications, and/or versions of the parent data processing applications, associated with the listed files, and/or documents, of the one or more virtual file listing displays are associated with their respective files, and/or documents, in the file management system and, in one embodiment, are also shown in the one or more virtual file listing displays in the file management system.

In one embodiment, one or more virtual file listing displays in the file management system are "virtual" in the sense that the actual files, and data, are represented, and can be linked to, but the actual files, and data, are not moved from their physical location in memory or their underlying file structure, i.e., data storage and organization scheme, or data storage system.

In one embodiment, the one or more parent data processing applications associated with the listed files, and/or documents, in the one or more virtual file listing displays in the file management system can be opened/launched through the file management system when the associated files, and/or documents, are selected for access, and/or when the parent data processing applications themselves are selected.

In one embodiment, a global file management user login/password is selected by, and/or assigned to, a user of the file management system. In one embodiment, the global file management user login/password is used by the user to access the file management system in response to a challenge/requirement from the file management system, typically made when signing into the file management system or when access to a file or parent data processing application is requested.

In one embodiment, process module 180 includes password vault module 271 that includes procedures, data, and/or instructions, for implementing an improved password vault that includes a listing of all files, and/or documents, that are processed by, and/or accessed through, the file management system and the individual passwords required to access the documents, files, folders, and/or groups of documents, files, or folders, that are processed by, and/or accessed through, the file management system.

In one embodiment, process module 180 includes batch processing module 281 that includes procedures, data, and/or instructions, for automated batch processing, such as batch upgrades, of files, using the file management system of file management system module 241 and the improved password vault of password vault 271. In one embodiment, when a user desires to perform a given process, such as a version or file update, on multiple files, i.e., the user desires to initiate batch processing, the user selects the batch of files, and/or documents, to be processed from the one or more virtual file listing displays through the file management system.

In one embodiment, the user selects the batch of files, and/or documents, to be processed from the one or more virtual file listing displays of virtual file listing display module 261 through a user interface display of the file management system and one or more user interface devices such as a keyboard, a mouse, a touchpad, voice recognition software, or any other mechanism or device for converting user actions into processor instructions and/or computer commands/actions.

In one embodiment, the associated parent data processing applications, and/or versions of the applications, for the selected files, and/or documents, of parent data processing application module 251 are identified by the file management system and the correct parent data processing application(s) is/are opened/launched automatically through the file management system. In one embodiment, the appropriate versions of the data processing applications are used to launch the selected individual files, and/or documents, through the file management system in the background.

In one embodiment, when the user selects the batch of files, and/or documents, to be processed from the one or more virtual file listing displays, the user is requested to provide the user's global file management user login/password, and/or username.

In one embodiment, once the user's global file management user login/password, and/or username, is provided and authenticated, and the parent data processing applications associated with the selected files, and/or documents, are opened/launched through the file management system, the individual passwords associated with the files, and/or documents, are automatically provided, or made available, to the parent data processing applications by the improved password vault, and/or through the file management system.

In one embodiment, once the user's global file management user login/password, and/or username, is provided and authenticated, and the parent data processing applications associated with the selected files, and/or documents, are opened/launched through the file management system, the individual passwords associated with the files, and/or documents, are provided to the parent data processing applications by the improved password vault, and/or through the file management system, for a defined time or in association with a specific token or use mechanism.

In one embodiment, each selected individual file, and/or document, is then automatically and sequentially accessed using the appropriate version of the parent data processing application and the appropriate password, and each selected individual file, and/or document, is automatically processed, in one embodiment, in the background, one at a time, by creating a backup of the file, and/or document, and then completing the file processing, such as a file upgrade. Consequently, in one embodiment, all the selected/designated individual files, and/or documents, in the batch are accessed for processing, and processed, without the user having to remember the appropriate version of the parent data processing applications or having to provide the individual passwords associated with the individual files, and/or documents, and without changing the physical memory locations of the data representing the files, and/or documents, or making any changes to the user's existing underlying data storage and organization system/scheme.

In one embodiment, process module 180 includes file restoration module 291 that includes procedures, data, and/or instructions, for automatic file restoration using the file management system of file management system module 241 and the improved password vault of password vault module 271.

In one embodiment, if a user needs to restore a selected file, and/or document, from a backup file, the user first activates/selects the backup file through the file management system. In one embodiment, the user activates/selects the backup file through a user interface display of the file management system and one or more user interface devices such as a keyboard, a mouse, a touchpad, voice recognition software, or any other mechanism or device for converting user actions into processor instructions and/or computer commands/actions.

In one embodiment, the associated parent data processing application, and/or version of the application, for the selected backup file, and/or document, is identified by the file management system and the correct parent data processing application of parent data processing application module 251 is opened/launched automatically through the file management system.

In one embodiment, the selected backup file, and/or document, is passed in, and launched, by the appropriate version of the parent data processing application. In one embodiment, the appropriate version of the data processing application is used to launch the selected backup file, and/or document, through the file management system in the background.

In one embodiment, when the user selects the backup file, or document, the user is requested to provide the user's global file management user login/password, and/or username.

In one embodiment, once the user's global file management user login/password, and/or username, is provided and authenticated, and the appropriate version of the parent data processing application associated with the selected backup file, or document, is opened/launched through the file management system, the selected backup file, or document, is opened/launched by the appropriate version of the parent data processing application.

In one embodiment, when the appropriate version of the parent data processing application launches the backup file, the appropriate version of the parent data processing application automatically detects that the file is a backup file and that the backup file is being launched from the file management system. As a result, once the appropriate version of the parent data processing application finishes loading the backup file, the appropriate version of the parent data processing application initiates an automatic file restore process whereby a restored user/company file is created based off the selected backup file.

In one embodiment, the appropriate version of the parent data processing application then opens the restored user/company file and the individual password associated with the restored user/company file is automatically provided, or made available to, to the parent data processing application by the improved password vault, and/or through the file management system.

In one embodiment, the appropriate version of parent data processing application then applies the appropriate password and accesses the restored user/company version of the file. Consequently, in one embodiment, a user/company file is automatically restored from a backup file, and/or document, without the user having to remember the appropriate version of the parent data processing application or having to provide the individual password associated with the individual file, and/or document, and without changing the physical memory locations of the data representing the files, and/or documents, or making any changes to the user's existing underlying data storage and organization system/scheme.

The operations, procedures, and data associated with file management system module 241, parent data processing application module 251, virtual file listing display module 261, password vault module 271, batch processing module 281, and file restoration module 291 are discussed in more detail below with respect to processes 200 and 300 of FIG. 2 and FIG. 3.

Also shown in FIG. 1 is optional provider computing system 120. In various embodiments, provider computing system 120 is under the control of, accessible by, or otherwise associated with, a provider of process for providing a file management system including automated file processing features and is used to implement at least part of a process for providing a file management system including automated file processing features.

As shown in FIG. 1, provider computing system 120 typically includes a central processing unit (CPU) 121, communications interface 125, and a memory system 123, including, in one embodiment, process module 180.

As noted above, in various embodiments, all, or part of, the operations, procedures, and data associated with file management system module 241, parent data processing application module 251, virtual file listing display module 261, password vault module 271, batch processing module 281, and file restoration module 291 are implemented in process module 180 of memory 123 of optional provider computing system 120. As also noted above, the operations, procedures, and data associated with file management system module 241, parent data processing application module 251, virtual file listing display module 261, password vault module 271, batch processing module 281, and file restoration module 291 are discussed in more detail below with respect to processes 200 and 300 of FIG. 2 and FIG. 3.

Returning to FIG. 1, provider computing system may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, provider computing system 120, whether available or known at the time of filing or as later developed.

In one embodiment, provider computing system 120 is representative of two or more computing systems.

In one embodiment, provider computing system 120 is a client computing system associated with one or more server computing systems. In one embodiment, provider computing system 120 is a server computing system that is, in turn, associated with one or more client computing systems. In one embodiment, provider computing system 120 is part of a cloud computing environment.

In one embodiment, provider computing system 120 is operatively coupled to user computing system 100 via communications link/channel 163.

Also shown in FIG. 1 is database 170. In one embodiment, database 170 includes all, or part of, the operations, procedures, and data associated with file management system module 241, parent data processing application module 251, virtual file listing display module 261, password vault module 271, batch processing module 281, and/or file restoration module 291, as received from user computing system 100, via communications link/channel 161, and/or provider computing system 120, via communications link/channel 165.

As also noted above, the operations, procedures, and data associated with file management system module 241, parent data processing application module 251, virtual file listing display module 261, password vault module 271, batch processing module 281, and file restoration module 291 are discussed in more detail below with respect to processes 200 and 300 of FIG. 2 and FIG. 3.

Returning to FIG. 1, in one embodiment, database 170 is a data storage device, a designated server system or computing system, or a designated portion of one or more server systems or computing systems, such as computing system(s) 100 and/or 120, or a distributed database, or an external and/or portable hard drive. In one embodiment, database 170 is a dedicated mass storage device implemented in software, hardware, or a combination of hardware and software.

In one embodiment, database 170 is a web-based function. As discussed in more detail below, in one embodiment, database 170 is under the control of, or otherwise accessible by, a process for providing a file management system including automated file processing features. In one embodiment, database 170 is part of a cloud computing environment.

In various embodiments, user computing system 100, and/or provider computing system 120, and/or database 170, are all operatively coupled by communication links/channels 161, 163, and 165. In various embodiments, any, or all, of communication links/channels 161, 163, and 165 can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

In one embodiment, user computing system 100, and/or provider computing system 120, and/or database 170, are part of any cloud computing environment.

Those of skill in the art will readily recognize that the components shown in FIG. 1, and their respective sub-components are shown for illustrative purposes only and that architectures with more or fewer components can implement, and benefit from, the invention. Moreover, one or more components of FIG. 1 may be located remotely from their respective system and accessed via any network, as discussed herein. In addition, the particular type of, and configuration of, user computing system 100, provider computing system 120, and database 170 are not relevant.

In addition, those of skill in the art will readily recognize that the choice of components, data, modules, and information shown in FIG. 1, the organization of the components, data, modules, and information shown in FIG. 1, and the manner of storage and location of storage of the data, modules, and information shown in FIG. 1 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 1 are illustrative only and not limiting. In various other embodiments, the particular modules and/or data shown in FIG. 1 can be grouped together in fewer modules and/or data locations or divided among more modules and/or data locations. Consequently, those of skill in the art will recognize that other orders and/or grouping are possible and the particular modules and/or data, order, and/or grouping shown in FIG. 1 discussed herein do not limit the scope as claimed below.

Process

According to one embodiment, a file management system provides one or more virtual file listing displays through which a user can select and access files and an improved password vault is created through the file management system. When files listed in the one or more virtual file listing displays are selected for access, the appropriate parent data processing application(s), and/or version(s) of the appropriate parent data processing application(s), is/are identified by the file management system and the appropriate parent data processing application(s) is/are opened/launched automatically through the file management system. The individual passwords associated with the selected files are then automatically provided to the appropriate parent data processing application(s) by the password vault, and/or through the file management system.

In various embodiments, the file management system, and improved password vault, are used to automatically, or semi-automatically, perform batch processing, such as batch upgrades of files. In one embodiment, the user selects the batch of files, and/or documents, to be processed from the one or more virtual file listing displays through the file management system. The individual files, and/or documents, are then accessed by automatically determining the appropriate version of the data processing application from the file management system necessary to access the selected files, and/or documents, and launching the appropriate version of the data processing application through the file management system, in one embodiment, in the background. In one embodiment, the appropriate individual passwords associated with the files, and/or documents, are automatically provided to the appropriate version of the parent data processing applications by the improved password vault, and/or through the file management system. Accesses to the files, and/or documents, is thereby provided, and each file, and/or document, is processed one at a time by creating a backup of the file, and/or document and then completing the file processing, such as a file upgrade. Consequently, all selected/designated files, and/or documents, in the batch are accessed for processing, and processed, without the user having to remember the appropriate version of the parent data processing applications or having to provide the individual passwords associated with the individual files, and/or documents.

FIG. 2 is a flow chart depicting a process for providing a file management system including automated file processing features 200 in accordance with one embodiment.

Process for providing a file management system including automated file processing features 200 begins at ENTER OPERATION 201 of FIG. 2 and process flow proceeds to PROVIDE A FILE MANAGEMENT SYSTEM WITH THE CAPABILITY TO DISPLAY VIRTUAL FILE LISTINGS OF FILES, AND/OR DOCUMENTS OPERATION 203.

In one embodiment, at PROVIDE A FILE MANAGEMENT SYSTEM WITH THE CAPABILITY TO DISPLAY VIRTUAL FILE LISTINGS OF FILES, AND/OR DOCUMENTS OPERATION 203 a file management system is provided.

In accordance with one embodiment, at least part of the file management system is provided at PROVIDE A FILE MANAGEMENT SYSTEM WITH THE CAPABILITY TO DISPLAY VIRTUAL FILE LISTINGS OF FILES, AND/OR DOCUMENTS OPERATION 203 on a user computing system, such as user computing system 100 of FIG. 1.

Returning to FIG. 2, in accordance with one embodiment, at least part of the file management system is provided at PROVIDE A FILE MANAGEMENT SYSTEM WITH THE CAPABILITY TO DISPLAY VIRTUAL FILE LISTINGS OF FILES, AND/OR DOCUMENTS OPERATION 203 on a provider computing system, such as provider computing system 120 of FIG. 1.

Returning to FIG. 2, in one embodiment, the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 is an application that identifies, collects, groups, and/or presents, multiple files, and/or documents, created by, provided by, stored by, and/or otherwise associated with, one or more parent data processing applications.

In various embodiments, the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 is associated with a single parent data processing application and only files, and/or documents, created by one or more versions of the parent data processing application are processed by the file management system.

One specific illustrative example of a single application file management system is Quickbooks File Manager™ available from Intuit, Inc. of Mountain View, Calif. that identifies, collects, groups, and presents multiple files, and/or documents, created using various versions of Quickbooks™, also available from Intuit, Inc. of Mountain View, Calif.

In various embodiments, the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 is associated with multiple parent data processing applications. In various embodiments, the parent data processing applications can be any data management applications implemented on a computing system and/or accessed through a network.

As noted above, herein, the terms "application", "data management application" and "parent data processing application" are used interchangeably and include, but are not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; computing system implemented, and/or online, docketing systems, packages, programs, modules, or applications; computing system implemented, and/or online, bookkeeping systems, packages, programs, modules, or applications; and various other personal and/or business electronic data management systems, packages, programs, modules, or applications, whether known at the time of filling or as developed later.

Specific examples of data management applications include, but are not limited to: QuickBooks™, available from Intuit, Inc. of Mountain View, Calif.; QuickBooks On-line™, available from Intuit, Inc. of Mountain View, Calif.; Quicken™, available from Intuit, Inc. of Mountain View, Calif.; Quicken On-line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other data management applications discussed herein, and/or known to those of skill in the art at the time of filing, and/or as developed after the time of filing.

In one embodiment, the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 provides a virtual file listing of the files, and/or documents, processed by the file management system in one or more virtual file listing displays.

In one embodiment, the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 allows a user to select and access the files, and/or documents, that reside in their original respective physical memory locations, through the one or more virtual file listing displays of the file management system.

In one embodiment, the parent data processing applications, and/or versions of the parent data processing applications, associated with the listed files, and/or documents, in the one or more virtual file listing displays of the file management system are associated with their respective files, and/or documents, by the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 and, in one embodiment, are also shown in the one or more virtual file listing displays of the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203.

In one embodiment, the one or more virtual file listing displays in the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 are virtual file listing displays meaning that the actual files, and data, are represented, and can be linked to, but the actual files, and data, are not moved from their physical location in memory or their underlying file structure.

As discussed in more detail below, in one embodiment, the one or more parent data processing applications associated with the listed files, and/or documents, in the one or more virtual file listing displays in the file management system can be opened/launched through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 when the associated files, and/or documents, are selected for access, and/or when the parent data processing applications themselves are selected.

In one embodiment, a user can select and access the files, and/or documents, in the one or more virtual file listing displays of the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 via a user interface display.

Figure 4:
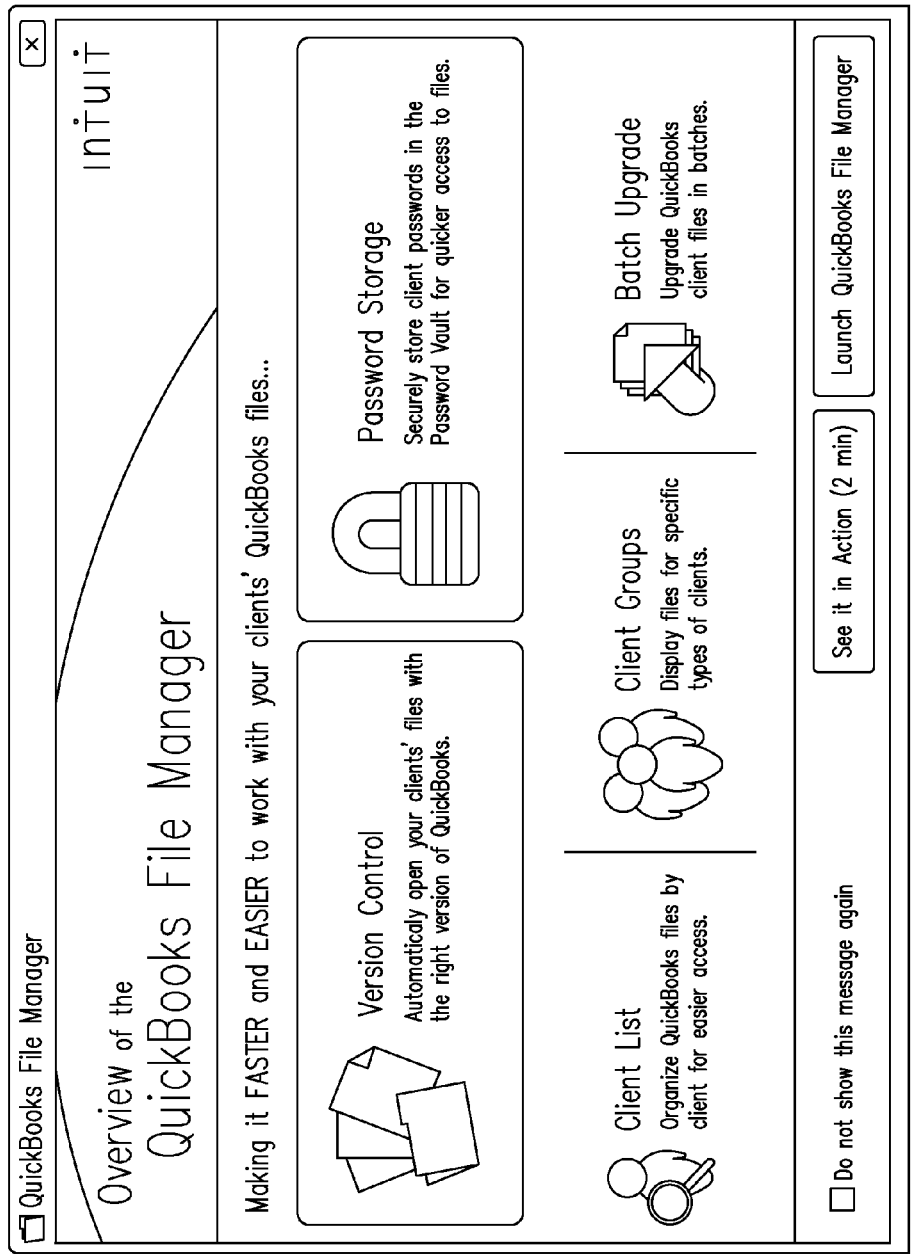
FIG. 4 is an illustrative example of a user interface display for accessing a file management system in accordance with one embodiment.

FIG. 4 shows one illustrative example of a user interface display for accessing a file management system 401 in accordance with one embodiment. In one embodiment, user interface display for accessing a file management system 401 is a "home" or "landing" page display associated with one embodiment of a file management system, such as a file management system that is provided at PROVIDE A FILE MANAGEMENT SYSTEM WITH THE CAPABILITY TO DISPLAY VIRTUAL FILE LISTINGS OF FILES, AND/OR DOCUMENTS OPERATION 203.

FIG. 5 shows one illustrative example of a virtual file listing display 503 provided as part of a file manager display 501 also provided at PROVIDE A FILE MANAGEMENT SYSTEM WITH THE CAPABILITY TO DISPLAY VIRTUAL FILE LISTING OF FILES, AND/OR DOCUMENTS OPERATION 203.

As seen in FIG. 5, virtual file listing display 503 includes virtual file listings, such as exemplary virtual file listing 505 that include the name of the file, the physical location of the file, the last modified date associated with the file, and the application type and version that created, uses, and/or is associated with, the file.

As also seen in FIG. 5, in this specific illustrative example, virtual file listing display 503 includes file listings grouped by the associated client and file type using one or more virtual file listing display parameters.

Those of skill in the art will readily recognize that FIG. 5 shows but one example of a file manager display 501 and virtual file listing display 503. Consequently, FIG. 5 is presented and discussed for illustrative purposes and is not intended to limit the scope of the claims presented below.

Returning to FIG. 2, in various embodiments, a user can select and access the files, and/or documents, in the file, and/or document, listing of the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 via a user interface display, such as virtual file listing display 503 of FIG. 5, and one or more user interface devices including, but not limited to: a keyboard, such as keyboard 107 of FIG. 1; a mouse, such as mouse 111 of FIG. 1; a touchpad; voice recognition software; or any other mechanism or device for converting user actions into processor instructions and/or computer commands/actions.

Returning to FIG. 2, in one embodiment, a global file management user login/password is selected by, and/or assigned to, a user of the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203. In one embodiment, the global file management user login/password is used by the user to access the file management system in response to a challenge/requirement from the file management system, typically made when signing into the file management system or when access to a file or parent data processing application is requested.

Returning to FIG. 2, once a file management system is provided at PROVIDE A FILE MANAGEMENT SYSTEM WITH THE CAPABILITY TO DISPLAY VIRTUAL FILE LISTINGS OF FILES, AND/OR DOCUMENTS OPERATION 203, process flow proceeds to CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205.

In one embodiment, at CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205 an improved password vault is created by the user through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203.

In one embodiment, the improved password vault of CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205 includes a listing of all documents, files, folders, and/or groups of documents, files, or folders, that are processed by, and/or accessed through, the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 and the individual passwords required to access the documents, files, folders, and/or groups of documents, files, or folders, that are processed by, and/or accessed through, the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203.

In one embodiment, at CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205 data representing the documents, files, folders, and/or groups of documents, files, or folders and the individual passwords associated with the documents, files, folders, and/or groups of documents, files, or folders is entered into the improved password vault through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 via a user interface display and one or more user interface devices including, but not limited to: a keyboard, such as keyboard 107 of FIG. 1; a mouse, such as mouse 111 of FIG. 1; a touchpad; voice recognition software; or any other mechanism or device for converting user actions into processor instructions and/or computer commands/actions.

Returning to FIG. 2, in one embodiment, at CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205 the data representing the documents, files, folders, and/or groups of documents, files, or folders and the individual passwords associated with the documents, files, folders, and/or groups of documents, files, or folders are linked to each other, mapped to each other, or otherwise associated with each other.

In one embodiment, at CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205 the data representing the documents, files, folders, and/or groups of documents, files, or folders and the individual passwords associated with the documents, files, folders, and/or groups of documents, files, or folders are linked to each other, mapped to each other, or otherwise associated with each other using one or more processors, such as CPU 101 and/or CPU 121 of FIG. 1, associated with one or more computing systems, such as user computing system 100 and/or provider computing system 120 of FIG. 1.

Returning to FIG. 2, in one embodiment, at CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205 data representing and linking the documents, files, folders, and/or groups of documents, files, or folders and the individual passwords associated with the documents, files, folders, and/or groups of documents, files, or folders is entered into the improved password vault through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 only when the specific documents, files, folders, and/or groups of documents, files, or folders and passwords are being initially entered into the password vault through the file WITH THE CAPABILITY TO DISPLAY VIRTUAL FILE LISTINGS OF FILES, AND/OR DOCUMENTS OPERATION 203, or when the individual passwords are being modified.

In one embodiment, at CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205 data representing and linking the documents, files, folders, and/or groups of documents, files, or folders and the individual passwords associated with the documents, files, folders, and/or groups of documents, files, or folders is securely stored in the password fault under the direction of one or more processors, such as CPU 101 and/or CPU 121 of FIG. 1, associated with one or more computing systems, such as user computing system 100 and/or provider computing system 120 of FIG. 1.

Returning to FIG. 2, in various embodiments, at CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205 parent applications, and/or specific versions of the parent applications, associated with the specific documents, files, folders, and/or groups of documents, files, or folders that should legitimately need access to the specific documents, files, folders, and/or groups of documents, files, or folders are also linked with the data indicating and linking the specific documents, files, folders, and/or groups of documents, files, or folders and passwords, and this data is also securely stored in the password fault.

FIG. 6 shows an illustrative example of a password vault display 601 as would be provided, and/or used at CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205.

As seen in FIG. 6, password vault display 601 includes a listing of, in this illustrative example, clients, i.e., listing of clients 603 and the listing of permitted users 605, as well as individual password entries 607 and individual password confirmations 609.

Those of skill in the art will readily recognize that FIG. 6 shows but one example of a password vault display 601. Consequently, FIG. 6 is presented and discussed for illustrative purposes and is not intended to limit the scope of the claims presented below.

It is noteworthy that the specific illustrative example of FIG. 6, includes a password vault display 601 where clients are assigned individual client passwords and these client passwords are used to access all files associated with the client that are processed by the file manager.

In some instances, the individual files have individual file passwords associated with the files, irrespective of the client, or any client password. In one embodiment, the user can select whether an individual client password is used, as in FIG. 6, or an individual file password is used.

Returning to FIG. 2, in one embodiment, once an improved password vault is created by the user through the file management system of PROVIDE A FILE MANAGEMENT SYSTEM WITH THE CAPABILITY TO PROVIDE VIR- TUAL FILE LISTINGS OF FILES, AND/OR DOCUMENTS OPERATION 203 at CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205 process flow proceeds to SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207.

In one embodiment, at SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 a user decides to perform a given process, such as a version or file update, on multiple files, i.e., the user decides to initiate batch processing, and the user selects a batch of files, and/or documents, to be processed from the one or more virtual file listing displays of the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203.

In one embodiment, at SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207, the user selects the batch of files, and/or documents, to be processed from the one or more virtual file listing displays via a user interface display, such as virtual file listing display 503 of FIG. 5, and one or more user interface devices including, but not limited to: a keyboard, such as keyboard 107 of FIG. 1; a mouse, such as mouse 111 of FIG. 1; a touchpad; voice recognition software; or any other mechanism or device for converting user actions into processor instructions and/or computer commands/actions.

Returning to FIG. 2, in one embodiment, the batch processing to be performed on the selected files of SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 is a batch upgrade process whereby the selected files of SELECT ONE OR MORE FILES, AND/OR DOCUMENTS, THROUGH THE VIRTUAL FILE LISTINGS OF 207 are automatically upgraded, and/or updated, in the background.

In various embodiments, files to be batch upgraded are selected at SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 via a user interface display and one or more user interface devices including, but not limited to: a keyboard, such as keyboard 107 of FIG. 1; a mouse, such as mouse 111 of FIG. 1; a touchpad; voice recognition software; or any other mechanism or device for converting user actions into processor instructions and/or computer commands/actions.

Figure 7:
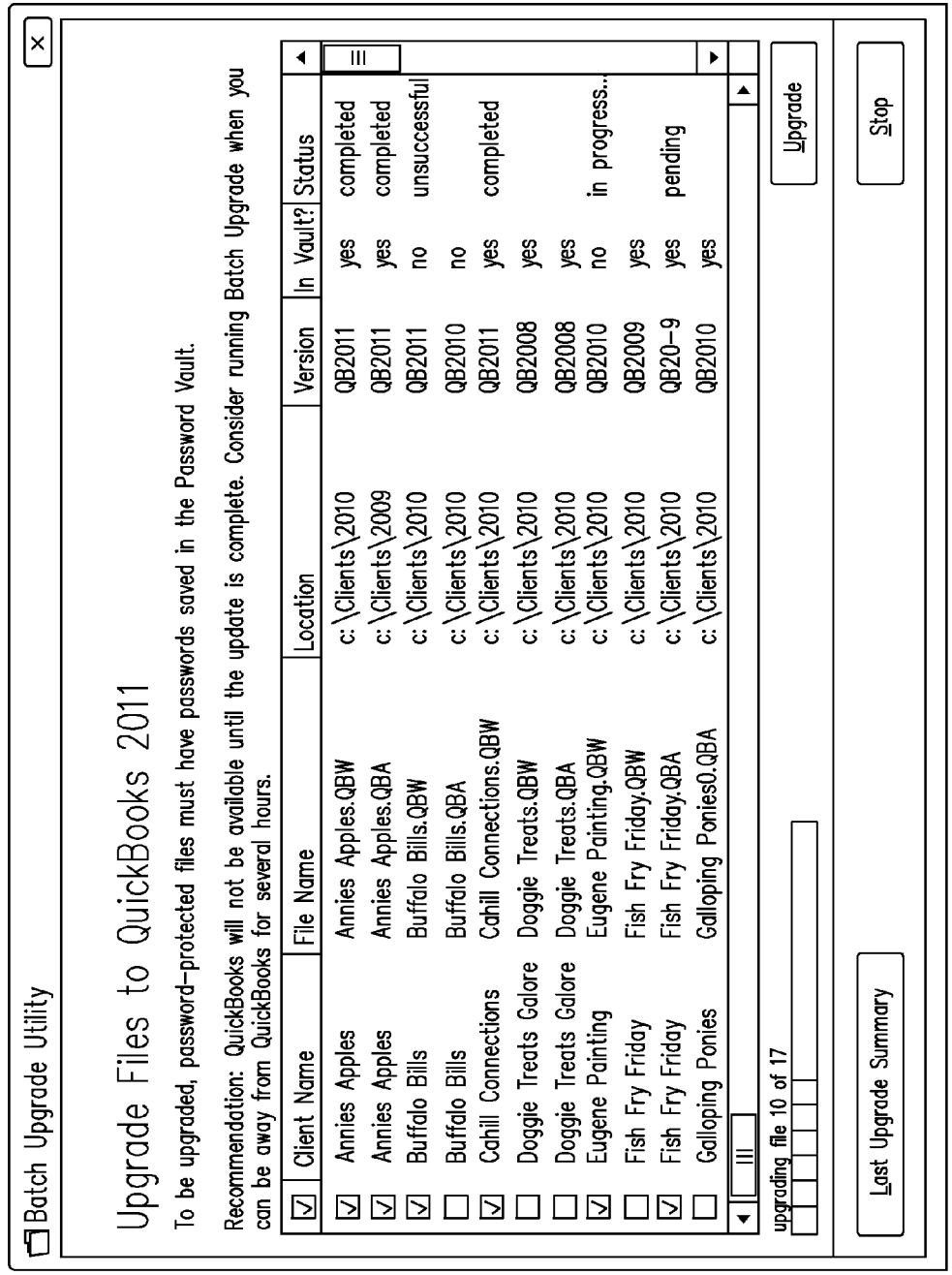
FIG. 7 is an illustrative example of a user interface display for performing a batch upgrade of selected files in accordance with one embodiment.

FIG. 7 shows one illustrative example of a user interface display for performing a batch upgrade of selected files 701 in accordance with one embodiment.

Returning to FIG. 2, in one embodiment, once a user decides to perform a given process, such as a version or file update, on multiple files, i.e., the user decides to initiate batch processing, and the user selects a batch of files, and/or documents, to be processed from the one or more virtual file listing displays of the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 at SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 process flow proceeds to IDENTIFY AND OPEN/LAUNCH THE APPROPRIATE PARENT DATA PROCESSING APPLICATION(S) ASSOCIATED WITH THE SELECTED FILES, AND/OR DOCUMENTS, THROUGH THE FILE MANAGEMENT SYSTEM OPERATION 209.

In one embodiment, at IDENTIFY AND OPEN/LAUNCH THE APPROPRIATE PARENT DATA PROCESSING APPLICATION(S) ASSOCIATED WITH THE SELECTED FILES, AND/OR DOCUMENTS, THROUGH THE FILE MANAGEMENT SYSTEM OPERATION 209 the associated parent data processing applications, and/or versions of the applications, for the selected files, and/or documents, of SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 are identified by the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 and the correct parent data processing application(s) is/are opened/launched automatically through the file management system.

In one embodiment, at IDENTIFY AND OPEN/LAUNCH THE APPROPRIATE PARENT DATA PROCESSING APPLICATION(S) ASSOCIATED WITH THE SELECTED FILES, AND/OR DOCUMENTS, THROUGH THE FILE MANAGEMENT SYSTEM OPERATION 209 the associated parent data processing applications, and/or versions of the applications, for the selected files, and/or documents, of SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 are identified by the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 and the correct parent data processing application(s) is/are opened/launched automatically through the file management system under the direction of one or more processors associated with one or more computing systems, such as CPU 101 and/or CPU 121 of FIG. 1, associated with one or more computing systems, such as user computing system 100 and/or provider computing system 120 of FIG. 1.

Returning to FIG. 2, in one embodiment, at IDENTIFY AND OPEN/LAUNCH THE APPROPRIATE PARENT DATA PROCESSING APPLICATION(S) ASSOCIATED WITH THE SELECTED FILES, AND/OR DOCUMENTS, THROUGH THE FILE MANAGEMENT SYSTEM OPERATION 209 the associated parent data processing applications, and/or versions of the applications, for the selected files, and/or documents, of SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 are identified by the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 and the correct parent data processing application(s) is/are opened/launched automatically through the file management system in the background.

In one embodiment, when the user selects the batch of files, and/or documents, to be processed from the one or more virtual file listing displays, the user is requested to provide the user's global file management user login/password, and/or username.

In one embodiment, once the associated parent data processing applications, and/or versions of the applications, for the selected files, and/or documents, of SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 are identified by the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 and the correct parent data processing application(s) is/are opened/launched automatically through the file management system at IDENTIFY AND OPEN/LAUNCH THE APPROPRIATE PARENT DATA PROCESSING APPLICATION(S) ASSOCIATED WITH THE SELECTED FILES, AND/OR DOCUMENTS, THROUGH THE FILE MANAGEMENT SYSTEM OPERATION 209, process flow proceeds to AUTOMATICALLY PROVIDE THE APPROPRIATE PARENT DATA PROCESSING APPLICATION(S) THE PASSWORDS ASSOCIATED WITH THE SELECTED FILES, AND/OR DOCUMENTS, THROUGH THE PASSWORD VAULT OPERATION 211.

In one embodiment, at AUTOMATICALLY PROVIDE THE APPROPRIATE PARENT DATA PROCESSING APPLICATION(S) THE PASSWORDS ASSOCIATED WITH THE SELECTED FILES, AND/OR DOCUMENTS, THROUGH THE PASSWORD VAULT OPERATION 211, the individual passwords associated with the files, and/or documents, selected at SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 are automatically provided, or made available, to the parent data processing applications of IDENTIFY AND OPEN/LAUNCH THE APPROPRIATE PARENT DATA PROCESSING APPLICATION(S) ASSOCIATED WITH THE SELECTED FILES, AND/OR DOCUMENTS, THROUGH THE FILE MANAGEMENT SYSTEM OPERATION 209 by the improved password vault of CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205, and/or through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203.

As noted above, in one embodiment, when the user selects the batch of files, and/or documents, to be processed from the one or more virtual file listing THROUGH THE VIRTUAL FILE LISTINGS OF THE FILE MANAGEMENT SYSTEM FOR BATCH PROCESSING OPERATION 207, the user is requested to provide the user's global file management user login/password, and/or username for the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203. Consequently, in one embodiment, once the user's global file management user login/password, and/or username, is provided and authenticated, and the parent data processing applications associated with the selected files, and/or documents, are opened/launched through the file management system, the individual passwords associated with the files, and/or documents, are automatically provided, or made available, to the parent data processing applications by the improved password vault, and/or through the file management system.

In one embodiment, once the user's global file management user login/password, and/or username, is provided and authenticated, and the parent data processing applications associated with the selected files, and/or documents, are opened/launched through the file management system, the individual passwords associated with the files, and/or documents, are provided to the parent data processing applications by the improved password vault, and/or through the file management system, for a defined time or in association with a specific token or use mechanism.

In one embodiment, once the individual passwords associated with the files, and/or documents, selected at SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 are automatically provided, or made available, to the parent data processing applications of IDENTIFY AND OPEN/LAUNCH THE APPROPRIATE PARENT DATA PROCESSING APPLICATION(S) ASSOCIATED WITH THE SELECTED FILES, AND/OR DOCUMENTS, THROUGH THE FILE MANAGEMENT SYSTEM OPERATION 209 by the improved password vault of CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205, and/or through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 203 at AUTOMATICALLY PROVIDE THE APPROPRIATE PARENT DATA PROCESSING APPLICATION(S) THE PASSWORDS ASSOCIATED WITH THE SELECTED FILES, AND/OR DOCUMENTS, THROUGH THE PASSWORD VAULT OPERATION 211, process flow proceeds to AUTOMATICALLY ACCESS THE SELECTED FILES, AND/OR DOCUMENTS, AND AUTOMATICALLY PERFORM THE DESIRED PROCESSING FOR THE INDIVIDUAL FILES, AND/OR DOCUMENTS, OF THE SELECTED BATCH OF FILES, AND/OR DOCUMENTS OPERATION 213.

In one embodiment, at AUTOMATICALLY ACCESS THE SELECTED FILES, AND/OR DOCUMENTS, AND AUTOMATICALLY PERFORM THE DESIRED PROCESSING FOR THE INDIVIDUAL FILES, AND/OR DOCUMENTS, OF THE SELECTED BATCH OF FILES, AND/OR DOCUMENTS OPERATION 213 each selected individual file, and/or document, of SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 is automatically, and, in one embodiment, sequentially, accessed using the appropriate version of the parent data processing application of IDENTIFY AND OPEN/LAUNCH THE APPROPRIATE PARENT DATA PROCESSING APPLICATION(S) THROUGH THE FILE MANAGEMENT SYSTEM OPERATION 209 and the appropriate password of AUTOMATICALLY PROVIDE THE APPROPRIATE PARENT DATA PROCESSING APPLICATION(S) THE PASSWORDS ASSOCIATED WITH THE SELECTED FILES, AND/OR DOCUMENTS, THROUGH THE PASSWORD VAULT OPERATION 211, and each selected individual file, and/or document, is automatically processed in accordance with the desired batch processing procedure.

In one embodiment, at AUTOMATICALLY ACCESS THE SELECTED FILES, AND/OR DOCUMENTS, AND AUTOMATICALLY PERFORM THE DESIRED PROCESSING FOR THE INDIVIDUAL FILES, AND/OR DOCUMENTS, OF THE SELECTED BATCH OF FILES, AND/OR DOCUMENTS OPERATION 213 each selected individual file, and/or document, is automatically accessed using the appropriate version of the parent data processing application and the appropriate password, and each selected individual file, and/or document, is automatically processed, under the direction of one or more processors associated with one or more computing systems, such as CPU 101 and/or CPU 121 of FIG. 1, associated with one or more computing systems, such as user computing system 100 and/or provider computing system 120 of FIG. 1.

Returning to FIG. 2, in one embodiment, at AUTOMATICALLY ACCESS THE SELECTED FILES, AND/OR DOCUMENTS, AND AUTOMATICALLY PERFORM THE DESIRED PROCESSING FOR THE INDIVIDUAL FILES, AND/OR DOCUMENTS, OF THE SELECTED BATCH OF FILES, AND/OR DOCUMENTS OPERATION 213 each selected individual file, and/or document, is automatically accessed using the appropriate version of the parent data processing application and the appropriate password, and each selected individual file, and/or document, is automatically processed, in the background, one at a time, by creating a backup of the file, and/or document, and then completing the file processing, such as a file upgrade.

Consequently, in one embodiment, all the selected/designated individual files, and/or documents, in the batch of SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 are accessed for processing, and processed, without the user having to remember the appropriate version of the parent data processing applications or having to provide the individual passwords associated with the individual files, and/or documents, and without changing the physical memory locations of the data representing the files, and/or documents, or making any changes to the user's existing underlying data storage and organization system/scheme.

In one embodiment, once each selected individual file, and/or document, of SELECT ONE OR MORE FILES, AND/OR DOCUMENTS, THROUGH THE VIRTUAL FILE LISTINGS OF THE FILE MANAGEMENT SYSTEM FOR BATCH PROCESSING OPERATION 207 is automatically, and, in one embodiment, sequentially, accessed using the appropriate version of the parent data processing application of IDENTIFY AND OPEN/LAUNCH THE APPROPRIATE PARENT DATA PROCESSING APPLICATION(S) ASSOCIATED WITH THE SELECTED FILES, AND/OR DOCUMENTS, THROUGH THE FILE MANAGEMENT SYSTEM OPERATION 209 and the appropriate password of AUTOMATICALLY PROVIDE THE APPROPRIATE PARENT DATA PROCESSING APPLICATION(S) THE PASSWORDS ASSOCIATED WITH THE SELECTED FILES, AND/OR DOCUMENTS, THROUGH THE PASSWORD VAULT OPERATION 211, and each selected individual file, and/or document, is automatically processed in accordance with the desired batch processing procedure at AUTOMATICALLY ACCESS THE SELECTED FILES, AND/OR DOCUMENTS, AND AUTOMATICALLY PERFORM THE DESIRED PROCESSING FOR THE INDIVIDUAL FILES, AND/OR DOCUMENTS, OF THE SELECTED BATCH OF FILES, AND/OR DOCUMENTS OPERATION 213, process flow proceeds to EXIT OPERATION 230.

In one embodiment, at EXIT OPERATION 230 process for providing a file management system including automated file processing features 200 is exited to await new data and/or instructions.

In the discussion above, certain aspects of one embodiment include process steps or operations or instructions described herein for illustrative purposes in a particular order or grouping. However, the particular order or groupings shown and discussed herein are illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

According to one embodiment, a file management system provides one or more virtual file listing displays through which a user can select and access files and an improved password vault is created through the file management system. When files listed in the one or more virtual file listing displays are selected for access, the appropriate parent data processing application(s), and/or version(s) of the appropriate parent data processing application(s), is/are identified by the file management system and the appropriate parent data processing application(s) is/are opened/launched automatically through the file management system. The individual passwords associated with the selected files are then automatically provided to the appropriate parent data processing application(s) by the password vault, and/or through the file management system.

In various embodiments, the file management system, and improved password vault, are used to perform automatic file restoration. In one embodiment, if a user needs to restore a selected file, and/or document, from a backup file, the user first activates the backup file through the file management system. The appropriate version of the parent data processing application necessary to access the selected backup file is then identified and launched on the user's computing system by the file management system and the selected backup file is passed in, and launched, by the appropriate version of the parent data processing application. When the appropriate version of the parent data processing application launches the backup file, the appropriate version of the parent data processing application automatically detects that the file is a backup file and that the backup file is being launched from the file management system. As a result, once the appropriate version of the parent data processing application finishes loading the backup file, the appropriate version of the parent data processing application initiates an automatic file restore process whereby a restored user/company file is created based off the selected backup file. The appropriate version of the parent data processing application then opens the restored user/company file and the appropriate password is automatically provided to the appropriate version of parent data processing application by the improved password vault, and/or through the file management system. The appropriate version of parent data processing application then applies the password and accesses the restored user/company version of the file.

Figure 3:
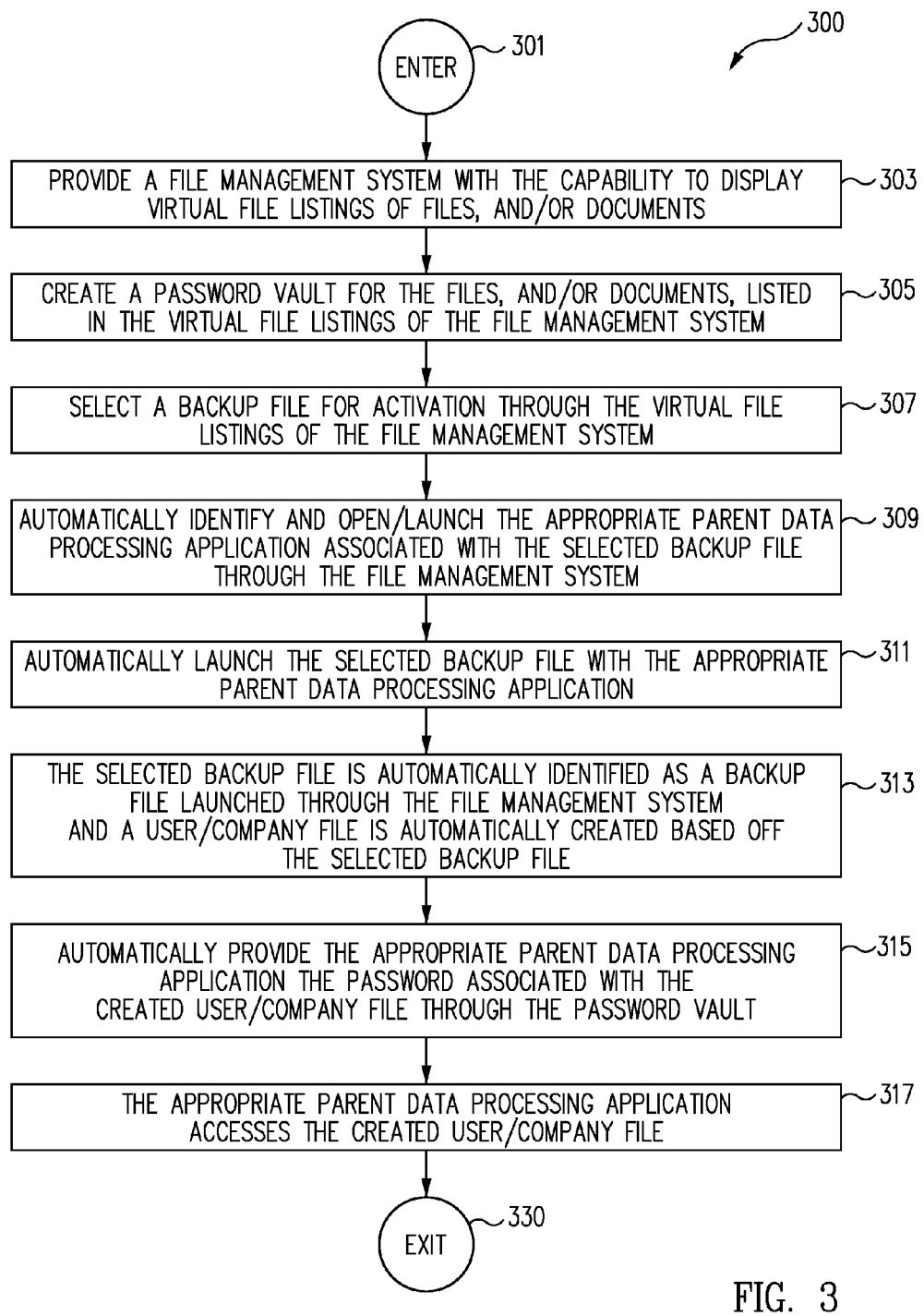
FIG. 3 is a flow chart depicting one embodiment of a process for providing a file management system including automated file processing features and performing automatic restoration of files in accordance with one embodiment.

FIG. 3 is a flow chart depicting a process for providing a file management system including automated file processing features 300 in accordance with one embodiment.

Process for providing a file management system including automated file processing features 300 begins at ENTER OPERATION 301 of FIG. 3 and process flow proceeds to PROVIDE A FILE MANAGEMENT SYSTEM WITH THE CAPABILITY TO DISPLAY VIRTUAL FILE LISTINGS OF FILES, AND/OR DOCUMENTS OPERATION 303.

In one embodiment, at PROVIDE A FILE MANAGEMENT SYSTEM WITH THE CAPABILITY TO DISPLAY VIRTUAL FILE LISTINGS OF FILES, AND/OR DOCUMENTS OPERATION 303 a file management system, such as the file management system provided at PROVIDE A FILE MANAGEMENT SYSTEM WITH THE CAPABILITY TO DISPLAY VIRTUAL FILE LISTINGS OF FILES, AND/OR DOCUMENTS OPERATION 203 of FIG. 2, and as described above, is provided.

In accordance with one embodiment, at least part of the file management system is provided at PROVIDE A FILE MANAGEMENT SYSTEM WITH THE CAPABILITY TO DISPLAY OPERATION 303 on a user computing system, such as user computing system 100 of FIG. 1.

Returning to FIG. 3, in accordance with one embodiment, at least part of the file management system is provided at PROVIDE A FILE MANAGEMENT SYSTEM WITH THE CAPABILITY TO DISPLAY VIRTUAL FILE LISTINGS OF FILES, AND/OR DOCUMENTS OPERATION 303 on a provider computing system, such as provider computing system 120 of FIG. 1.

Returning to FIG. 3, once a file management system is provided at PROVIDE A FILE MANAGEMENT SYSTEM WITH THE CAPABILITY TO DISPLAY VIRTUAL FILE LISTINGS OF FILES, AND/OR DOCUMENTS OPERATION 303, process flow proceeds to CREATE A PASSWORD VAULT FOR THE FILES, AND/OR DOCUMENTS, LISTED IN THE VIRTUAL FILE LISTINGS OF FILE MANAGEMENT SYSTEM OPERATION 305.

In one embodiment, at CREATE A PASSWORD VAULT FOR THE FILES, AND/OR DOCUMENTS, LISTED IN THE VIRTUAL FILE LISTINGS OF FILE MANAGEMENT SYSTEM OPERATION 305 an improved password vault, such as the improved password vault of CREATE A PASSWORD VAULT FOR THE FILES, AND/OR DOCUMENTS, LISTED IN THE VIRTUAL FILE LISTINGS OF THE FILE MANAGEMENT SYSTEM OPERATION 205 of FIG. 2, and as discussed above, is created by the user through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 303 (FIG. 3).

In one embodiment, once an improved password vault is created by the user through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 303 at CREATE A PASSWORD VAULT FOR THE FILES, AND/OR DOCUMENTS, LISTED IN THE VIRTUAL process flow proceeds to SELECT A BACKUP FILE FOR ACTIVATION THROUGH THE VIRTUAL FILE LISTINGS OF THE FILE MANAGEMENT SYSTEM OPERATION 307.

In one embodiment, at SELECT A BACKUP FILE FOR ACTIVATION THROUGH THE VIRTUAL FILE LISTINGS OF THE FILE MANAGEMENT SYSTEM OPERATION 307 the user activates/selects a backup file through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 303.

In one embodiment, at SELECT A BACKUP FILE FOR ACTIVATION THROUGH THE VIRTUAL FILE LISTINGS OF THE FILE MANAGEMENT SYSTEM OPERATION 307 the user activates/selects the backup file via a user interface display, such as virtual file listing display 503 of FIG. 5, and one or more user interface devices including, but not limited to: a keyboard, such as keyboard 107 of FIG. 1; a mouse, such as mouse 111 of FIG. 1; a touchpad; voice recognition software; or any other mechanism or device for converting user actions into processor instructions and/or computer commands/actions.

Returning to FIG. 3, in one embodiment, when the user selects the backup file, or document, the user is requested to provide the user's global file management user login/password, and/or username for the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 303.

In one embodiment, once the user activates/selects a backup file through the file management system of PROVIDE A FILE MANAGEMENT SYSTEM WITH THE CAPABILITY TO DISPLAY VIRTUAL FILE LISTINGS OF FILE FOR ACTIVATION THROUGH THE VIRTUAL FILE LISTINGS OF THE FILE MANAGEMENT SYSTEM OPERATION 307, process flow proceeds to AUTOMATICALLY IDENTIFY AND OPEN/LAUNCH THE APPROPRIATE PARENT DATA PROCESSING APPLICATION ASSOCIATED WITH THE SELECTED BACKUP FILE THROUGH THE FILE MANAGEMENT SYSTEM OPERATION 309.

In one embodiment, at AUTOMATICALLY IDENTIFY AND OPEN/LAUNCH THE APPROPRIATE PARENT DATA PROCESSING APPLICATION ASSOCIATED WITH THE SELECTED BACKUP FILE THROUGH THE FILE MANAGEMENT SYSTEM OPERATION 309 the parent data processing application, and/or version of the application, for the selected backup file of SELECT A BACKUP FILE FOR ACTIVATION THROUGH THE VIRTUAL FILE LISTINGS OF THE FILE MANAGEMENT SYSTEM OPERATION 307 is identified by the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 303 and the correct parent data processing application is opened/launched automatically through the file management system.

In one embodiment, at AUTOMATICALLY IDENTIFY AND OPEN/LAUNCH THE APPROPRIATE PARENT DATA PROCESSING APPLICATION ASSOCIATED WITH THE SELECTED BACKUP FILE THROUGH THE FILE MANAGEMENT SYSTEM OPERATION 309 the selected backup file, and/or document, is passed in, and launched, by the appropriate version of the parent data processing application under the direction of one or more processors associated with one or more computing systems, such as CPU 101 and/or CPU 121 of FIG. 1, associated with one or more computing systems, such as user computing system 100 and/or provider computing system 120 of FIG. 1.

Returning to FIG. 3, in one embodiment, the appropriate version of the data processing application is used to launch the selected backup file, and/or document, through the file management system in the background.

In one embodiment, once the parent data processing application, and/or version of the application, for the selected backup file of SELECT A BACKUP FILE FOR ACTIVATION THROUGH THE VIRTUAL FILE LISTINGS OF THE FILE MANAGEMENT SYSTEM OPERATION 307 is identified by the file management system and the correct parent data processing application is opened/launched automatically through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 303 at AUTOMATICALLY IDENTIFY AND OPEN/LAUNCH THE APPROPRIATE PARENT DATA PROCESSING APPLICATION ASSOCIATED WITH THE SELECTED BACKUP FILE THROUGH THE FILE MANAGEMENT SYSTEM OPERATION 309, process flow proceeds to AUTOMATICALLY LAUNCH THE SELECTED BACKUP FILE WITH THE APPROPRIATE PARENT DATA PROCESSING APPLICATION OPERATION 311.

In one embodiment, at AUTOMATICALLY LAUNCH THE SELECTED BACKUP FILE WITH THE APPROPRIATE PARENT DATA PROCESSING APPLICATION OPERATION 311 the appropriate version of the parent data processing application of AUTOMATICALLY IDENTIFY AND OPEN/LAUNCH THE APPROPRIATE PARENT DATA PROCESSING APPLICATION ASSOCIATED WITH THE SELECTED BACKUP FILE THROUGH THE FILE MANAGEMENT SYSTEM OPERATION 309 associated with the selected backup file, or document, of SELECT A BACKUP FILE FOR ACTIVATION THROUGH THE VIRTUAL FILE LISTINGS OF THE FILE MANAGEMENT SYSTEM OPERATION 307 is opened/launched through the file management system of PROVIDE A FILE MANAGEMENT SYSTEM WITH THE CAPABILITY TO DISPLAY VIRTUAL FILE LISTINGS OF backup file, or document, is opened/launched by the appropriate version of the parent data processing application.

As noted above, in one embodiment, when the user selects the backup file, or document, at SELECT A BACKUP FILE FOR ACTIVATION THROUGH THE VIRTUAL FILE LISTINGS OF THE FILE MANAGEMENT SYSTEM OPERATION 307 the user is requested to provide the user's global file management user login/password, and/or username. Consequently, in one embodiment, at AUTOMATICALLY LAUNCH THE SELECTED BACKUP FILE WITH THE APPROPRIATE PARENT DATA PROCESSING APPLICATION OPERATION 311 once the user's global file management user login/password, and/or username, is provided and authenticated, and the appropriate version of the parent data processing application associated with the selected backup file, or document, is opened/launched through the file management system, the selected backup file, or document, is opened/launched by the appropriate version of the parent data processing application.

In one embodiment, once the appropriate version of the parent data processing application of AUTOMATICALLY IDENTIFY AND OPEN/LAUNCH THE APPROPRIATE PARENT DATA PROCESSING APPLICATION ASSOCIATED WITH THE SELECTED BACKUP FILE THROUGH THE FILE MANAGEMENT SYSTEM OPERATION 309 associated with the selected backup file, or document, of SELECT A BACKUP FILE FOR ACTIVATION THROUGH THE VIRTUAL FILE LISTINGS OF THE FILE MANAGEMENT SYSTEM OPERATION 307 is opened/launched through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 303, and the selected backup file, or document, is opened/launched by the appropriate version of the parent data processing application at AUTOMATICALLY LAUNCH THE SELECTED BACKUP FILE WITH THE APPROPRIATE PARENT DATA PROCESSING APPLICATION OPERATION 311, process flow proceeds to THE SELECTED BACKUP FILE IS AUTOMATICALLY IDENTIFIED AS A BACKUP FILE LAUNCHED THROUGH THE FILE MANAGEMENT SYSTEM AND A USER/COMPANY FILE IS AUTOMATICALLY CREATED BASED OFF THE SELECTED BACKUP FILE OPERATION 313.

In one embodiment, at THE SELECTED BACKUP FILE IS AUTOMATICALLY IDENTIFIED AS A BACKUP FILE LAUNCHED THROUGH THE FILE MANAGEMENT SYSTEM AND A USER/COMPANY FILE IS AUTOMATICALLY CREATED BASED OFF THE SELECTED BACKUP FILE OPERATION 313 the appropriate version of the parent data processing application automatically detects that the file is a backup file and that the backup file is being launched from the file management system and, as a result, the appropriate version of the parent data processing application initiates an automatic file restore process whereby a restored user/company file is created based off the selected backup file.

In one embodiment, when the appropriate version of the parent data processing application launches the backup file at AUTOMATICALLY LAUNCH THE SELECTED BACKUP FILE WITH THE APPROPRIATE PARENT DATA PROCESSING APPLICATION OPERATION 311, the appropriate version of the parent data processing application automatically detects that the file is a backup file and that the backup file is being launched from the file management system at THE SELECTED BACKUP FILE IS AUTOMATICALLY IDENTIFIED AS A BACKUP FILE LAUNCHED THROUGH THE FILE MANAGEMENT SYSTEM AND A USER/COMPANY FILE IS AUTOMATICALLY CREATED BASED OFF THE SELECTED BACKUP FILE OPERATION 313. As a result, once the appropriate version of the parent data processing application finishes loading the backup file, at THE SELECTED BACKUP FILE IS AUTOMATICALLY IDENTIFIED AS A BACKUP FILE LAUNCHED THROUGH THE FILE MANAGEMENT SYSTEM AND A USER/COMPANY FILE IS AUTOMATICALLY CREATED BASED OFF THE SELECTED BACKUP FILE OPERATION 313 the appropriate version of the parent data processing application initiates an automatic file restore process whereby a restored user/company file is created based off the selected backup file.

In one embodiment, at THE SELECTED BACKUP FILE IS AUTOMATICALLY IDENTIFIED AS A BACKUP FILE LAUNCHED THROUGH THE FILE MANAGEMENT SYSTEM AND A USER/COMPANY FILE IS AUTOMATICALLY CREATED BASED OFF THE SELECTED BACKUP FILE OPERATION 313 the appropriate version of the parent data processing application automatically detects that the file is a backup file and that the backup file is being launched from the file management system and, as a result, the appropriate version of the parent data processing application initiates an automatic file restore process whereby a restored user/company file is created based off the selected backup file under the direction of one or more processors associated with one or more computing systems, such as CPU 101 and/or CPU 121 of FIG. 1, associated with one or more computing systems, such as user computing system 100 and/or provider computing system 120 of FIG. 1.

Returning to FIG. 3, in one embodiment, once the appropriate version of the parent data processing application automatically detects that the file is a backup file and that the backup file is being launched from the file management system and, the appropriate version of the parent data processing application initiates an automatic file restore process whereby a restored user/company file is created based off the selected backup file at THE SELECTED BACKUP FILE IS AUTOMATICALLY IDENTIFIED AS A BACKUP FILE LAUNCHED THROUGH THE FILE MANAGEMENT SYSTEM AND A USER/COMPANY FILE IS AUTOMATICALLY CREATED BASED OFF THE SELECTED BACKUP FILE OPERATION 313, process flow proceeds to AUTOMATICALLY PROVIDE THE APPROPRIATE PARENT DATA PROCESSING APPLICATION THE PASSWORD ASSOCIATED WITH THE CREATED USER/COMPANY FILE THROUGH THE PASSWORD VAULT OPERATION 315.

In one embodiment, at AUTOMATICALLY PROVIDE THE APPROPRIATE PARENT DATA PROCESSING APPLICATION THE PASSWORD ASSOCIATED WITH THE CREATED USER/COMPANY FILE THROUGH THE PASSWORD VAULT OPERATION 315 the appropriate version of the parent data processing application of AUTOMATICALLY IDENTIFY AND OPEN/LAUNCH THE APPROPRIATE PARENT DATA PROCESSING APPLICATION ASSOCIATED WITH THE SELECTED BACKUP FILE THROUGH THE FILE MANAGEMENT SYSTEM OPERATION 309 accesses the restored user/company file of THE SELECTED BACKUP FILE IS AUTOMATICALLY IDENTIFIED AS A BACKUP FILE LAUNCHED THROUGH THE FILE MANAGEMENT SYSTEM AND A USER/COMPANY FILE IS AUTOMATICALLY CREATED BASED OFF THE SELECTED BACKUP FILE OPERATION 313 and the individual password associated with the restored user/company file is automatically provided, or made available to, to the parent data processing application by the improved password vault of CREATE A PASSWORD VAULT FOR THE FILES, AND/OR DOCUMENTS, LISTED IN THE VIRTUAL FILE LISTINGS OF FILE MANAGEMENT SYSTEM OPERATION 305, and/or through the file management system of PROVIDE A FILE MANAGEMENT SYSTEM WITH THE CAPABILITY TO DISPLAY VIRTUAL FILE LISTINGS OF FILES, AND/OR DOCUMENTS OPERATION 303.

In one embodiment, at AUTOMATICALLY PROVIDE THE APPROPRIATE PARENT DATA PROCESSING APPLICATION THE PASSWORD ASSOCIATED WITH THE CREATED USER/COMPANY FILE THROUGH THE PASSWORD VAULT OPERATION 315 the appropriate version of the parent data processing application accesses the restored user/company file and the individual password associated with the restored user/company file is automatically provided, or made available to, to the parent data processing application by the improved password vault, and/or through the file management system under the direction of one or more processors associated with one or more computing systems, such as CPU 101 and/or CPU 121 of FIG. 1, associated with one or more computing systems, such as user computing system 100 and/or provider computing system 120 of FIG. 1.

Returning to FIG. 3, in one embodiment, once the appropriate version of the parent data processing application of AUTOMATICALLY IDENTIFY AND OPEN/LAUNCH THE APPROPRIATE PARENT DATA PROCESSING APPLICATION ASSOCIATED WITH THE SELECTED BACKUP FILE THROUGH THE FILE MANAGEMENT SYSTEM OPERATION 309 accesses the restored user/company file of THE SELECTED BACKUP FILE IS AUTOMATICALLY IDENTIFIED AS A BACKUP FILE LAUNCHED THROUGH THE FILE MANAGEMENT SYSTEM AND A USER/COMPANY FILE IS AUTOMATICALLY CREATED BASED OFF THE SELECTED BACKUP FILE OPERATION 313 and the individual password associated with the restored user/company file is automatically provided, or made available to, to the parent data processing application by the improved password vault of CREATE A PASSWORD VAULT FOR THE FILES, AND/OR DOCUMENTS, LISTED IN THE VIRTUAL FILE LISTINGS OF FILE MANAGEMENT SYSTEM OPERATION 305, and/or through the file management system TO DISPLAY VIRTUAL FILE LISTINGS OF FILES, AND/OR DOCUMENTS OPERATION 303 at AUTOMATICALLY PROVIDE THE APPROPRIATE PARENT DATA PROCESSING APPLICATION THE PASSWORD ASSOCIATED WITH THE CREATED USER/COMPANY FILE THROUGH THE PASSWORD VAULT OPERATION 315, process flow proceeds to THE APPROPRIATE PARENT DATA PROCESSING APPLICATION ACCESSES THE CREATED USER/COMPANY FILE OPERATION 317.

In one embodiment, at THE APPROPRIATE PARENT DATA PROCESSING APPLICATION ACCESSES THE CREATED USER/COMPANY FILE OPERATION 317 the appropriate version of parent data processing application of AUTOMATICALLY IDENTIFY AND OPEN/LAUNCH THE APPROPRIATE PARENT DATA PROCESSING APPLICATION ASSOCIATED WITH THE SELECTED BACKUP FILE THROUGH THE FILE MANAGEMENT SYSTEM OPERATION 309 applies the appropriate password and accesses the restored user/company version of the file of THE SELECTED BACKUP FILE IS AUTOMATICALLY IDENTIFIED AS A BACKUP FILE LAUNCHED THROUGH THE FILE MANAGEMENT SYSTEM AND A USER/COMPANY FILE IS AUTOMATICALLY CREATED BASED OFF THE SELECTED BACKUP FILE OPERATION 313.

In one embodiment, at THE APPROPRIATE PARENT DATA PROCESSING APPLICATION ACCESSES THE CREATED USER/COMPANY FILE OPERATION 317 the appropriate version of parent data processing application applies the appropriate password and accesses the restored user/company version of the file under the direction of one or more processors associated with one or more computing systems, such as CPU 101 and/or CPU 121 of FIG. 1, associated with one or more computing systems, such as user computing system 100 and/or provider computing system 120 of FIG. 1.

Consequently, in one embodiment, a user/company file is automatically restored from a backup file, and/or document, without the user having to remember the appropriate version of the parent data processing application or having to provide the individual password associated with the individual file, and/or document, and without changing the physical memory locations of the data representing the files, and/or documents, or making any changes to the user's existing underlying data storage and organization system/scheme.

In one embodiment, once the appropriate version of parent data processing application of AUTOMATICALLY IDENTIFY AND OPEN/LAUNCH THE APPROPRIATE PARENT DATA PROCESSING APPLICATION ASSOCIATED WITH THE SELECTED BACKUP FILE THROUGH THE FILE MANAGEMENT SYSTEM OPERATION 309 applies the appropriate password and accesses the restored user/company version of the file of THE SELECTED BACKUP FILE IS AUTOMATICALLY IDENTIFIED AS A BACKUP FILE LAUNCHED THROUGH THE FILE MANAGEMENT SYSTEM AND A USER/COMPANY FILE IS AUTOMATICALLY CREATED BASED OFF THE SELECTED BACKUP FILE OPERATION 313 at THE APPROPRIATE PARENT DATA PROCESSING APPLICATION ACCESSES THE CREATED USER/COMPANY FILE OPERATION 317, process flow proceeds to EXIT OPERATION 330.

In one embodiment, at EXIT OPERATION 330 process for providing a file management system including automated file processing features 300 is exited to await new data and/or instructions.

Using embodiments of processes for providing a file management system including automated file processing features 200 and 300, client and/or project lists are automatically created based on actual data, files, and/or documents, in the user's data system and customizable virtual related file listings are created to display listings of related files, and/or documents, without physically changing the current memory location of the data representing the files, and/or documents, or making any changes to user's existing underlying data storage and organization system/scheme.

In addition, using processes for providing a file management system including automated file processing features 200 and 300, an improved password vault is implemented, and passwords are provided, through the file management system. Therefore, the improved password vault is well suited to implementation with data processing applications that require the creation, retention, and use of multiple passwords associated with multiple clients/projects, and/or files, and/or folders created and/or processed by the data processing applications. Consequently, processes for providing a file management system including automated file processing features 200 and 300 provide applications, and users of the applications, simple, selective, and secure access to multiple passwords associated with multiple clients/projects, and/or files, and/or folders.

In addition, using processes for providing a file management system including automated file processing features 200 and 300, the file management system and improved password vault are used to automate and simplify file processing and maintenance functions, such as batch processing and restoration of files, without physically changing the current memory location of the data representing the files, and/or documents, or making any changes to user's existing underlying data storage and organization system/scheme and without requiring users of data processing applications to retain and provide multiple passwords associated with multiple clients/projects, and/or files, and/or folders. Consequently, using processes for providing a file management system including automated file processing features 200 and 300, a significant burden is removed from the user and potential security risks are avoided.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "launching", "monitoring", "obtaining", "opening", "processing", "providing", "receiving", "requesting", "requiring", "saving", "selecting", "sending", "storing", "transferring", "transforming", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. and discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing a file management system including automated file processing features comprising:

using one or more processors associated with one or more computing systems to provide a file management system, the file management system being associated with a parent application, the file management system including a virtual file listing display, the virtual file listing display including a virtual file listing of one or more files associated with the parent data processing application, the virtual file listing display allowing selection of, and access to, the files listed in the virtual file listing display;

using one or more processors associated with one or more computing systems to determine and record data indicating an appropriate version of the parent application associated with each of the files listed in the virtual file listing display;

providing an improved password vault, the improved password vault including a password vault listing of at least some of the files listed in the virtual file listing display and the passwords associated with the files listed in the password vault listing;

a user selecting a batch of one or more files through the virtual file listing display of the file management system for batch processing by a selected process;

responsive to the user selecting a batch of one or more files, requesting and then receiving a global password of the user;

for each of the one or more files of the selected batch of one or more files, using one or more processors associated with one or more computing systems to automatically launch, responsive to the global password of the user being received, the appropriate version of the parent application associated with the file through the file management system;

for each of the one or more files of the selected batch of one or more files, using the improved password vault to automatically provide the appropriate version of the parent application access associated with the file access to the file, the file access being provided through the improved password vault providing, through the file management system, individual file access passwords for each of the one or more files of the selected batch of one or more files, the file management system then granting access, by the appropriate version of the parent application, to the one or more files; and for each of the one or more files of the selected batch of one or more files, using one or more processors associated with one or more computing systems to automatically apply the selected process to the file.

2. The computing system implemented process for providing a file management system including automated file processing features of claim 1, wherein the virtual file listing display of the file management system includes a data field for data indicating an appropriate version of the parent application associated with each of the files listed in the virtual file listing display.

3. The computing system implemented process for providing a file management system including automated file processing features of claim 1, wherein once the user selects the batch of one or more files through the virtual file listing display of the file management system for batch processing by the selected process, the user is required to provide a global file management system login/password and/or a username associated with the user to the file management system.

4. The computing system implemented process for providing a file management system including automated file processing features of claim 1, wherein the file management system uses one or more processors associated with one or more computing systems to identify and/or collect files associated with the parent application, and display the files in the virtual file listing display according to a client, and/or customer, and/or company associated with the files.

5. The computing system implemented process for providing a file management system including automated file processing features of claim 1, wherein the file management system uses one or more processors associated with one or more computing systems to identify and/or collect files associated with the parent application, and display the files in the virtual file listing display according to a project associated with the files.

6. The computing system implemented process for providing a file management system including automated file processing features of claim 1, wherein the file management system uses one or more processors associated with one or more computing systems to identify and/or collect files associated with the parent application, and display the files in the virtual file listing display according to file type.

7. The computing system implemented process for providing a file management system including automated file processing features of claim 1, wherein at least one of the passwords associated with the files listed in the password vault listing of the improved password vault provides access to two or more files.

8. The computing system implemented process for providing a file management system including automated file processing features of claim 1, wherein at least one of the passwords associated with the files listed in the password vault listing of the improved password vault provides access to only a single file.

9. The computing system implemented process for providing a file management system including automated file processing features of claim 1, wherein the selected process to be applied to each of the one or more files of the selected batch of one or more files is an upgrade process.

10. A system for providing a file management system including automated file processing features comprising:
- one or more computing systems implementing at least part of a parent data processing application;
- a file management system, the file management system being associated with the parent data processing application, the file management system including a virtual file listing display, the virtual file listing display including a virtual file listing of one or more files associated with the parent data processing application, the virtual file listing display allowing selection of, and access to, the files listed in the virtual file listing display;
- an improved password vault, the improved password vault including a password vault listing of at least some of the files listed in the virtual file listing display and the passwords associated with the files listed in the password vault listing; and
- one or more processors associated with one or more computing systems, the file management system including automated file processing features, the process for providing a file management system including automated file processing features including:
- using the one or more processors associated with the one or more computing systems to determine and record data indicating an appropriate version of the parent application associated with each of the files listed in the virtual file listing display;
- a user selecting a batch of one or more files through the virtual file listing display of the file management system for batch processing by a selected process;
- responsive to the user selecting a batch of one or more files, requesting and then receiving a global password of the user;
- for each of the one or more files of the selected batch of one or more files, using the one or more processors associated with the one or more computing systems to automatically launch, responsive to the global password of the user being received, the appropriate version of the parent application associated with the file through the file management system;
- for each of the one or more files of the selected batch of one or more files, using the improved password vault to automatically provide the appropriate version of the parent application associated with the file access to the file, the file access being provided through the improved password vault providing, through the file management system, individual file access passwords for each of the one or more files of the selected batch of one or more files, the file management system then granting access, by the appropriate version of the parent application, to the one or more files; and
- for each of the one or more files of the selected batch of one or more files using the one or more processors associated with the one or more computing systems to automatically apply the selected process to the file.

11. The system for providing a file management system including automated file processing features of claim 10, wherein
the virtual file listing display of the file management system includes a data field for data indicating an appropriate version of the parent application associated with each of the files listed in the virtual file listing display.

12. The system for providing a file management system including automated file processing features of claim 10, wherein
once the user selects the batch of one or more files through the virtual file listing display of the file management system for batch processing by the selected process, the user is required to provide a global file management system login/password and/or a username associated with the user to the file management system.

13. The system for providing a file management system including automated file processing features of claim 10, wherein
the file management system uses one or more processors associated with one or more computing systems to identify and/or collect files associated with the parent application, and display the files in the virtual file listing display according to a client, and/or customer, and/or company associated with the files.

14. The system for providing a file management system including automated file processing features of claim 10, wherein
the file management system uses one or more processors associated with one or more computing systems to identify and/or collect files associated with the parent application, and display the files in the virtual file listing display according to a project associated with the files.

15. The system for providing a file management system including automated file processing features of claim 10, wherein
the file management system uses one or more processors associated with one application, and display the files in the virtual file listing display according to file type.

16. The system for providing a file management system including automated file processing features of claim 10, wherein
at least one of the passwords associated with the files listed in the password vault listing of the improved password vault provides access to two or more files.

17. The system for providing a file management system including automated file processing features of claim 10, wherein
at least one of the passwords associated with the files listed in the password vault listing of the improved password vault provides access to only a single file.

18. The system for providing a file management system including automated file processing features of claim 10, wherein
the selected process to be applied to each of the one or more files of the selected batch of one or more files is an upgrade process.

* * * * *

UNITED STATES PATENT AND TRADEMARK OFFICE
CERTIFICATE OF CORRECTION

PATENT NO. : 8,856,176 B1
APPLICATION NO. : 13/219072
DATED : October 7, 2014
INVENTOR(S) : Aravinth Venu et al.

It is certified that error appears in the above-identified patent and that said Letters Patent is hereby corrected as shown below:

In the Claims

In Column 41, Line 19, Claim 10, between "systems, the" and "file management system", insert -- one or more computing systems implementing at least part of a process for providing a --; and
In Column 42, Line 35, Claim 15, between "associated with one" and "application", insert -- or more computing systems to identify and/or collect files associated with the parent --.

Signed and Sealed this
Fourteenth Day of April, 2015

Michelle K. Lee
*Director of the United States Patent and Trademark Office*